US009235991B2

(12) United States Patent
Cooper et al.

(10) Patent No.: US 9,235,991 B2
(45) Date of Patent: Jan. 12, 2016

(54) TRANSPORTATION NETWORK SCHEDULING SYSTEM AND METHOD

(71) Applicant: General Electric Company, Schenectady, NY (US)

(72) Inventors: Jared Klineman Cooper, Melbourne, FL (US); Joseph Forrest Noffsinger, Lee's Summit, MO (US); Ajith Kuttannair Kumar, Erie, PA (US); Mason Samuels, Melbourne, FL (US); Paul Houpt, Niskayuna, NY (US); Joel Kickbusch, Melbourne, FL (US); Mahir Telatar, Melbourne, FL (US); David Eldredge, Melbourne, FL (US); Mitchell Scott Wills, Melbourne, FL (US); Ramu Chandra, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 78 days.

(21) Appl. No.: 14/158,024

(22) Filed: Jan. 17, 2014

(65) Prior Publication Data

US 2014/0136025 A1 May 15, 2014

Related U.S. Application Data

(63) Continuation-in-part of application No. 13/311,759, filed on Dec. 6, 2011, now Pat. No. 8,655,518, and a continuation-in-part of application No. 13/311,807, filed on Dec. 6, 2011, now abandoned.

(51) Int. Cl.
*G05D 1/00* (2006.01)
*G08G 9/00* (2006.01)
(Continued)

(52) U.S. Cl.
CPC . *G08G 9/00* (2013.01); *B61L 3/006* (2013.01); *B61L 27/0016* (2013.01); *B61L 27/0027* (2013.01); *B61L 27/0094* (2013.01); *B61L 15/0027* (2013.01)

(58) Field of Classification Search
CPC ...... G08G 9/00; G07C 5/008; G07C 9/00309; G07C 2009/0793; B60R 25/00; F02N 11/0807; B61L 2205/04; B61L 25/025; B61L 17/00; B61L 25/021; B61L 25/026
USPC ......... 701/2, 465, 411, 19, 107, 400; 340/994
See application file for complete search history.

(56) References Cited

U.S. PATENT DOCUMENTS 4,896,580 A * 1/1990 Rudnicki ..................... 89/1.815
5,177,684 A 1/1993 Harker et al.

(Continued)

FOREIGN PATENT DOCUMENTS

EP 04554983 A 8/1998
WO 2004059446 A2 7/2004

OTHER PUBLICATIONS

Copy of International Search Report and Written Opinion issued in connection with corresponding PCT Application No. PCT/US2012/064023 on Apr. 8, 2014.

(Continued)

*Primary Examiner* — Helal A Algahaim
*Assistant Examiner* — Shardul Patel
(74) *Attorney, Agent, or Firm* — GE Global Patent Operation; John A. Kramer

(57) ABSTRACT

A method includes forming a first schedule for a first vehicle to travel in a transportation network. The first schedule includes a first arrival time of the first vehicle at a scheduled location. The method also includes receiving a first trip plan for the first vehicle from an energy management system. The first trip plan is based on the first schedule and designates at least one of tractive efforts or braking efforts to be provided by the first vehicle to reduce at least one of an amount of energy consumed by the first vehicle or an amount of emissions generated by the first vehicle when the first vehicle travels through the transportation network to the scheduled location. The method further includes determining whether to modify the first schedule to avoid interfering with movement of one or more other vehicles by examining the trip plan for the first vehicle.

18 Claims, 11 Drawing Sheets

(51) Int. Cl.

| | |
|---|---|
| ***B61L 3/00*** | (2006.01) |
| ***B61L 27/00*** | (2006.01) |
| *B61L 15/00* | (2006.01) |

(56) References Cited

U.S. PATENT DOCUMENTS

| | | | | |
|---|---|---|---|---|
| 5,623,413 | A | 4/1997 | Matheson et al. | |
| 5,794,172 | A | 8/1998 | Matheson et al. | |
| 5,828,979 | A | 10/1998 | Polivka et al. | |
| 6,135,396 | A | 10/2000 | Whitfield et al. | |
| 6,144,901 | A * | 11/2000 | Nickles et al. | 701/19 |
| 6,154,735 | A | 11/2000 | Crone | |
| 6,263,266 | B1 * | 7/2001 | Hawthorne | 701/19 |
| 6,304,801 | B1 | 10/2001 | Doner | |
| 6,349,258 | B1 * | 2/2002 | Bonhoure et al. | 701/528 |
| 6,459,964 | B1 * | 10/2002 | Vu et al. | 701/19 |
| 6,681,174 | B1 * | 1/2004 | Harvey et al. | 701/117 |
| 7,340,328 | B2 | 3/2008 | Matheson et al. | |
| 7,343,314 | B2 | 3/2008 | Matheson et al. | |
| 7,395,141 | B1 | 7/2008 | Seck et al. | |
| 7,500,436 | B2 | 3/2009 | Kumar et al. | |
| 7,512,481 | B2 | 3/2009 | Julich et al. | |
| 7,618,011 | B2 | 11/2009 | Oleski et al. | |
| 7,669,534 | B2 | 3/2010 | Kumar et al. | |
| 7,680,750 | B2 | 3/2010 | Daum et al. | |
| 7,715,958 | B2 | 5/2010 | Kumar | |
| 7,715,977 | B2 | 5/2010 | Julich et al. | |
| 7,725,249 | B2 | 5/2010 | Kickbusch et al. | |
| 7,734,383 | B2 | 6/2010 | Philp et al. | |
| 7,797,088 | B2 | 9/2010 | Philp et al. | |
| 7,813,846 | B2 | 10/2010 | Wills et al. | |
| 7,882,789 | B2 | 2/2011 | Kumar et al. | |
| 7,937,193 | B2 | 5/2011 | Philp et al. | |
| 7,974,774 | B2 | 7/2011 | Kumar | |
| 8,025,115 | B2 | 9/2011 | King et al. | |
| 8,082,071 | B2 | 12/2011 | Daum et al. | |
| 8,295,993 | B2 | 10/2012 | Kumar | |
| 2002/0138195 | A1 * | 9/2002 | Watanabe | 701/207 |
| 2004/0034556 | A1 * | 2/2004 | Matheson et al. | 705/8 |
| 2005/0228553 | A1 * | 10/2005 | Tryon | 701/22 |
| 2006/0074544 | A1 * | 4/2006 | Morariu et al. | 701/117 |
| 2006/0164259 | A1 * | 7/2006 | Winkler et al. | 340/944 |
| 2007/0219681 | A1 * | 9/2007 | Kumar et al. | 701/19 |
| 2008/0109124 | A1 | 5/2008 | Daum et al. | |
| 2008/0201027 | A1 | 8/2008 | Julich et al. | |
| 2008/0288132 | A1 | 11/2008 | King et al. | |
| 2009/0037039 | A1 | 2/2009 | Yu et al. | |
| 2009/0099825 | A1 | 4/2009 | Bollapragada et al. | |
| 2009/0118970 | A1 | 5/2009 | Daum et al. | |
| 2009/0132113 | A1 | 5/2009 | Kumar et al. | |
| 2009/0204320 | A1 | 8/2009 | Shaffer et al. | |
| 2009/0254233 | A1 | 10/2009 | Noffsinger et al. | |
| 2009/0254405 | A1 * | 10/2009 | Hollis | 705/9 |
| 2010/0019726 | A1 | 1/2010 | Kumar | |
| 2010/0023190 | A1 | 1/2010 | Kumar et al. | |
| 2010/0043388 | A1 | 2/2010 | Mason et al. | |
| 2010/0150705 | A1 | 6/2010 | Mason et al. | |
| 2010/0153419 | A1 | 6/2010 | Daum et al. | |
| 2010/0163687 | A1 | 7/2010 | Brand et al. | |
| 2010/0185472 | A1 | 7/2010 | Goodermuth et al. | |
| 2010/0241295 | A1 | 9/2010 | Cooper et al. | |
| 2011/0051663 | A1 | 3/2011 | Cooper et al. | |
| 2011/0060486 | A1 | 3/2011 | Meltser et al. | |
| 2011/0099413 | A1 | 4/2011 | Cooper et al. | |
| 2011/0106327 | A1 | 5/2011 | Zhou et al. | |
| 2011/0106328 | A1 | 5/2011 | Zhou et al. | |
| 2011/0257869 | A1 | 10/2011 | Kumar et al. | |

OTHER PUBLICATIONS

Copy of PCT Search Report and Written Opinion issued in connection with corresponding Application No. PCT/US2012/062037 on Feb. 12, 2013.

* cited by examiner

TRANSPORTATION NETWORK SCHEDULING SYSTEM AND METHOD

CROSS-REFERENCE TO RELATED APPLICATIONS

This application is a continuation-in-part of U.S. patent application Ser. No. 13/311,759, which was filed on 6 Dec. 2011, and is entitled "Transportation Network Scheduling System And Method" (the "'759 Application"). This application also is a continuation-in-part of U.S. patent application Ser. No. 13/311,807, which also was filed on 6 Dec. 2011, and is entitled "Transportation Network Scheduling System And Method" (the "'807 Application").

The '759 Application and the '807 Application are related to U.S. patent application Ser. No. 13/311,977, which was filed on 6 Dec. 2011, and is entitled "System And Method For Allocating Resources In a Network" (the '977 Application"). The entire disclosures of the '759 Application, the '807 Application, and the '977 Application are incorporated by reference.

TECHNICAL FIELD

Embodiments of the invention relate to scheduling systems for vehicles traveling in a transportation network.

BACKGROUND

A transportation network for vehicles can include several interconnected main routes on which separate vehicles travel between locations. For example, a transportation network may be formed from interconnected railroad tracks with rail vehicles traveling along the tracks. The vehicles may travel according to schedules that dictate where and when the vehicles are to travel in the transportation network. The schedules may be predetermined in order to arrange for certain vehicles to arrive at various locations in the transportation network at desired times and/or in a desired order.

A network planning algorithm may be used to coordinate the schedules of several vehicles in the transportation network. One goal of the network planning algorithm may be to coordinate the schedules to avoid significant slowdowns or congested areas in the flow of movement in the transportation network. For example, the network planning algorithm may seek to arrange the schedules so that the vehicles are able to move to associated destination locations as quickly as possible.

Other algorithms may be used in conjunction with the travel of the vehicles to reduce fuel consumed by the vehicles. For example, a fuel optimization algorithm may be used to determine the speeds at which the vehicles are to travel to a destination location in order to reduce the amount of fuel consumed relative to traveling to the destination location at one or more other speeds. One goal of the fuel optimization algorithm may be to reduce the amount of fuel consumed as much as possible while still allowing the vehicles to reach associated destination locations.

When used together, the network planning algorithm and the fuel optimization algorithm may have competing goals. On one hand, the network planning algorithm may seek to get all vehicles to associated destination locations as quickly as possible, regardless of the amounts of fuel consumed by the vehicles. On the other hand, the fuel optimization algorithm may seek to get the vehicles to the associated destination locations while reducing fuel consumption. The fuel optimization algorithm may cause the vehicles to slow down and, as a result, arrive at the destination locations later than the vehicles could have otherwise arrived.

The goals of the network planning algorithm and the fuel optimization algorithm compete with each other and may result in one or both of the algorithms failing to reach the associated goals. A need exists for coordinating or harmonizing the goals of the different algorithms so that vehicles can travel to destination locations while reducing the amounts of fuel consumed, without significantly slowing the flow of travel of the vehicles in the transportation network.

As the vehicles travel through the transportation network, unforeseen or unplanned events may occur. For example, vehicles may mechanically break down (and slow down to run at a reduced capacity or stop movement completely), sections of the routes in the transportation network may become damaged, additional vehicles may enter into or pass through the transportation network, and the like. These events may disrupt travel of the vehicles in the transportation network. As this travel is disrupted, traffic or congestion of the vehicles may increase, thereby decreasing the flow of vehicles in the transportation network.

If traffic or congestion of the vehicles in the transportation network increases, the vehicles may be forced to abruptly slow down or stop movement in order to avoid collisions with other vehicles or to avoid coming within a predetermined distance or buffer from other vehicles. Such slowing down or stopping can cause the vehicles to consume fuel in relatively inefficient manners, which can increase the amount of fuel consumed in order to get the vehicles to the scheduled locations.

A need exists for scheduling travel in transportation networks that can adapt to changing circumstances, such as the detection of events that disrupt the travel of vehicles in the transportation networks.

BRIEF DESCRIPTION

In one embodiment, a method is provided that includes forming a first schedule for a first vehicle to travel in a transportation network. The first schedule includes a first arrival time of the first vehicle at a scheduled location. The method also includes receiving a first trip plan for the first vehicle from an energy management system. The first trip plan is based on the first schedule and designates at least one of tractive efforts or braking efforts to be provided by the first vehicle to reduce at least one of an amount of energy consumed by the first vehicle or an amount of emissions generated by the first vehicle when the first vehicle travels through the transportation network to the scheduled location. The method further includes determining whether to modify the first schedule to avoid interfering with movement of one or more other vehicles by examining the trip plan for the first vehicle.

For example, when schedules are generated for several vehicles to concurrently travel in the transportation network, the schedules may assume that all of the vehicles will primarily travel at or near speed limits of the transportation network when the vehicles are moving. The schedules may be coordinated so that vehicles do not block each other or cause slowdowns of each other (e.g., while one vehicle waits for another vehicle to move out of the way or pass), or so that such slowdowns are reduced relative to not coordinating the schedules with each other. One or more of the vehicles may generate a trip plan to reduce the emissions generated and/or fuel consumed by the one or more vehicles. This trip plan may cause the one or more vehicles to travel slower than the speed limits and/or slower than the speeds upon which the schedules of the vehicles are based. As a result, the one or more vehicles following the trip plan may move slower than expected by the creator of the schedules and consequently interfere with movements of other vehicles. For example, a first vehicle moving slower than expected and according to a trip plan may prevent a second vehicle from moving at or near a speed limit because the second vehicle is close behind the first vehicle is required by a schedule to wait for the first vehicle to meet or pass the second vehicle, and the like. The schedule of the second vehicle may be modified in order to avoid or reduce wasteful waiting or changes in the movement of the second vehicle, such as by changing a path taken by the second vehicle, changing a time at which the second vehicle is to meet or pass the first vehicle, and the like.

In another embodiment, a system is provided that includes a scheduling unit and a communication unit. One or more of the units may alternatively be referred to as modules. As used herein, the terms "unit" or "module" include a hardware and/or software system that operates to perform one or more functions. For example, a unit or module may include one or more computer processors, controllers, and/or other logic-based devices that perform operations based on instructions stored on a tangible and non-transitory computer readable storage medium, such as a computer memory. Alternatively, a unit or module may include a hard-wired device that performs operations based on hard-wired logic of a processor, controller, or other device. The units or modules shown in the attached figures may represent the hardware that operates based on software or hardwired instructions, the software that directs hardware to perform the operations, the computer readable storage medium having the instructions that direct one or more operations, or a combination thereof.

The scheduling unit is configured to form a first schedule for a first vehicle to travel in a transportation network. The first schedule includes a first arrival time of the first vehicle at a scheduled location. The communication unit is configured to receive a first trip plan for the first vehicle from an energy management system. The first trip plan is based on the first schedule and designates at least one of tractive efforts or braking efforts to be provided by the first vehicle to reduce at least one of an amount of energy consumed by the first vehicle or an amount of emissions generated by the first vehicle when the first vehicle travels through the transportation network to the scheduled location. The scheduling unit also is configured to determine whether to modify the first schedule to avoid interfering with movement of one or more other vehicles by examining the trip plan for the first vehicle.

In another embodiment, a method is provided that includes receiving a first schedule for a first vehicle to travel in a transportation network from a scheduling system. The first schedule includes a first arrival time of the first vehicle at a scheduled location. The method also includes forming a first trip plan for the first vehicle based on the first schedule. The trip plan designates at least one of tractive efforts or braking efforts to be provided by the first vehicle to reduce at least one of an amount of energy consumed by the first vehicle or an amount of emissions generated by the first vehicle when the first vehicle travels through the transportation network to the scheduled location. The method further includes communicating the first trip plan to the scheduling system so that the scheduling system can examine the first trip plan and determine whether to modify the first schedule based on the first trip plan.

In another embodiment, a system is provided that includes a communication unit and an energy management unit. The communication unit is configured to receive a first schedule for a first vehicle to travel in a transportation network from a scheduling system. The first schedule includes a first arrival time of the first vehicle at a scheduled location. The energy management unit is configured to form a first trip plan for the first vehicle based on the first schedule. The trip plan designates at least one of tractive efforts or braking efforts to be provided by the first vehicle to reduce at least one of an amount of energy consumed by the first vehicle or an amount of emissions generated by the first vehicle when the first vehicle travels through the transportation network to the scheduled location. The communication unit also is configured to communicate the first trip plan to the scheduling system so that the scheduling system can examine the first trip plan and determine whether to modify the first schedule based on the first trip plan.

In one embodiment, a system (e.g., a transportation network scheduling system) includes a scheduling module and a resolution module. The scheduling module is configured to determine plural initial schedules for plural different vehicles to concurrently travel in a transportation network formed from a plurality of interconnected routes. The initial schedules include one or more locations and associated times for the vehicles to travel along the routes of the transportation network. The resolution module is configured to modify at least one of the initial schedules to one or more modified schedules based on an anomaly in at least one of the vehicles or the routes that prevents one or more of the vehicles from traveling in the transportation network according to one or more of the initial schedules associated with the one or more of the vehicles.

As used herein, the term "anomaly" or "anomalies" can refer to a condition or conditions of a vehicle and/or a route along which the vehicle is traveling or is scheduled to travel that an initial or previous schedule of the vehicle is not based on. An anomaly may be a condition of the vehicle and/or the route that prevents the vehicle from traveling to and arriving at a scheduled destination location at a scheduled arrival time. Non-exclusive examples of anomalies can include mechanical failure or need of repair of the vehicle and/or route, slow orders or areas of the transportation network where vehicles are required to reduce speed below an otherwise allowable speed of the same area of the transportation network, an addition of one or more other vehicles onto the transportation network where the schedule of the vehicle is not based on or does not account for the presence of the other vehicles in the transportation network, and the like.

The scheduling module is configured to communicate the one or more modified schedules to one or more of the vehicles so that energy management systems disposed on the one or more of the vehicles modify travel of the one or more vehicles in the transportation network according to the one or more modified schedules.

In another embodiment, another system (e.g., vehicle control system) includes an energy management module and a communication module. The energy management module is configured to generate an initial trip plan for a control unit of a first vehicle. As used herein, the term "first" is used to distinguish one vehicle from another vehicle. Thus, the term "first" does not necessarily mean that the first vehicle is in front of a group of mechanically linked vehicles and/or the first vehicle to perform a function or detect an event. The initial trip plan is based on an initial schedule of travel for the first vehicle in a transportation network formed from a plurality of interconnected routes. The initial trip plan is used by the control unit to control tractive efforts of the first vehicle in the transportation network. The communication module is configured to receive a modified schedule for travel of the first vehicle in the transportation network. The modified schedule is based on discovery of an anomaly in the transportation network that prevents the first vehicle from traveling in the transportation network according to the initial schedule. The energy management module is configured to change the initial trip plan to a modified trip plan based on the modified schedule and communicate the modified trip plan to the control unit to change the tractive efforts of the first vehicle.

In another embodiment, a method (e.g., method for network scheduling) includes determining plural initial schedules for plural different vehicles to concurrently travel in a transportation network formed from a plurality of interconnected routes. The initial schedules include one or more locations and associated times for the vehicles to travel along the routes of the transportation network. The method also includes identifying an anomaly in at least one of the vehicles or the routes that prevents one or more of the vehicles from traveling in the transportation network according to one or more of the initial schedules associated with the one or more of the vehicles and modifying at least one of the initial schedules to one or more modified schedules based on an anomaly. The method further includes communicating the one or more modified schedules to one or more of the vehicles so that energy management systems disposed on the one or more of the vehicles modify travel of the one or more vehicles in the transportation network according to the one or more modified schedules.

In another embodiment, another method (e.g., method for vehicle control) includes generating an initial trip plan for a control unit of a first vehicle. The initial trip plan is based on an initial schedule of travel for the first vehicle in a transportation network formed from a plurality of interconnected routes. The initial trip plan is used by the control unit to control tractive efforts of the first vehicle in the transportation network. The method also includes receiving a modified schedule for travel of the first vehicle in the transportation network. The modified schedule is based on discovery of an anomaly in the transportation network that prevents the first vehicle from traveling in the transportation network according to the initial schedule. The method further includes changing the initial trip plan to a modified trip plan based on the modified schedule. The modified trip plan used by the control unit to change the tractive efforts of the first vehicle.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
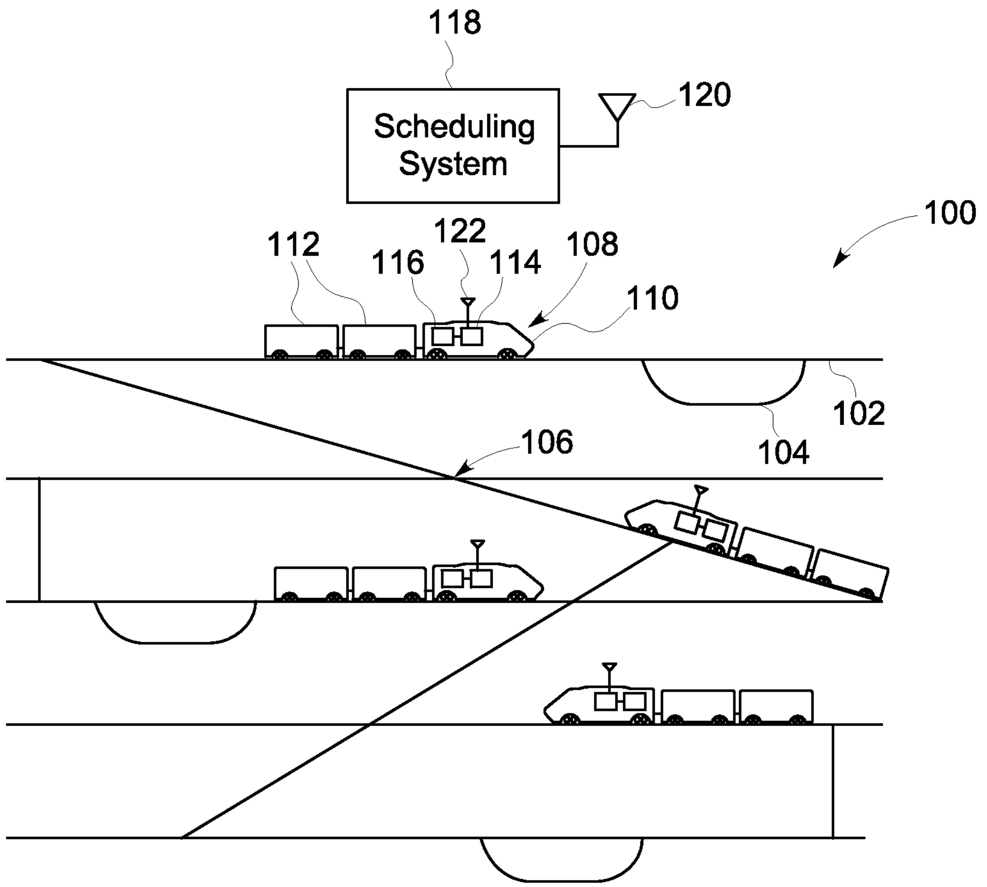
FIG. 1 is a schematic diagram of one embodiment of a transportation network.

One or more embodiments of the inventive subject matter described herein provide systems for generating schedules for vehicles to concurrently travel within a transportation network and energy management systems of the vehicles that create trip plans based on the schedules. The transportation network can be formed of plural interconnected routes, such as railroad tracks, roads, paths in water (e.g., marine shipping pathways), paths in air and/or space (e.g., airline routes), and the like. The vehicles may include powered units capable of self-propulsion, such as automobiles, airplanes, or marine vessels, locomotives, or other off-highway vehicles. The schedules may direct the vehicles to travel along the routes to destination locations at associated arrival times. Additionally or alternatively, the schedules may include one or more waypoints on the way to the destination locations and associated times that the vehicles are to travel to or past the waypoints.

The energy management systems of the vehicles may create the trip plans such that the vehicles travel to the destination locations in such a way as to reduce an amount of energy consumed by the vehicles (e.g., by reducing an amount of fuel consumed by the vehicles) and/or to reduce an amount of emissions (e.g., gaseous emissions) generated by the vehicles, as described below. The trip plan of one or more of the vehicles may result in the vehicles deviating from the schedules. For example, the trip plans may cause vehicles to arrive at the scheduled destination location at a time that is later than a scheduled arrival time and/or to pass one or more waypoints when traveling toward the destination location later than the scheduled times associated with the waypoints. The trip plan may direct a vehicle to operate at a lower throttle setting to conserve fuel and/or reduce emissions, and thereby cause the vehicle to travel at a slower rate and arrive later than a scheduled arrival time.

The trip plan of one or more of the vehicles is communicated to the scheduling system for examination. The scheduling system analyzes the trip plan to determine if travel according to the trip plan will disrupt the travel of other vehicles in the transportation network. For example, the scheduling system may determine if a first vehicle traveling at a slower rate than expected (such as by traveling below a speed limit of the routes) will impede, block, or otherwise interfere with one or more other vehicles traveling to associated scheduled destination locations. If the trip plan will cause such a disruption, then the scheduling system may modify the schedules of one or more of the vehicles to avoid the disruption, as described below.

The scheduling system can track movements of the vehicles as the vehicles travel in the transportation network according to the trip plans. The scheduling system can monitor locations and/or speeds of the vehicles in order to determine if one or more of the vehicles are deviating from associated trip plans and/or schedules. For example, mechanical malfunction and/or damage to the vehicles and/or routes, previously unknown lower speed limits on the routes, and/or other unscheduled events or occurrences may cause some of the vehicles to fall behind associated schedules. A vehicle that falls behind schedule can impede travel of other vehicles, such as by taking up space on a one-way route or otherwise slowing or preventing movement of another vehicle in the transportation network.

The scheduling system can use the actual movements of the vehicles and update the schedules accordingly. For example, if a first vehicle is slowed or prevented from traveling to a scheduled destination location at a scheduled arrival time, the scheduling system can change the destination location, arrival time, and/or path to take to the destination location. The scheduling system can send the modified schedules to the energy management systems of the vehicles, which can modify the trip plans accordingly. The back and forth between the scheduling system generating schedules, the energy management systems creating trip plans based on the schedules, the scheduling system modifying one or more schedules based on the trip plans and/or tracking actual movement of the vehicles and modifying the schedules based on deviations from the schedules of the vehicles, and so on, can allow for the scheduling system and the energy management systems to provide for improved flow of travel in and/or through the transportation network while reducing energy consumed by the vehicles and/or emissions generated by the vehicles.

One or more embodiments of the inventive subject matter described herein provide systems for modifying schedules of vehicles concurrently traveling in a transportation network when an anomaly is detected in the transportation network and/or when a previously detected anomaly in the transportation network is removed, repaired, or otherwise corrected. Systems for changing trip plans of the vehicles based on modified schedules of the vehicles also are provided. The trip plans may be changed so that the vehicles can adaptively modify tractive efforts, braking efforts, speeds, or the like, of the vehicles in order to arrive at a scheduled destination location while reducing the amount of fuel consumed by the vehicles.

FIG. 1 is a schematic diagram of one embodiment of a transportation network 100. The transportation network 100 includes a plurality of interconnected routes 102, such as railroad tracks, roads, or other paths across which vehicles travel. The transportation network 100 may extend over a relatively large area, such as hundreds of square miles or kilometers of land area. In the illustrated embodiment, the routes 102 include siding sections 104 to allow vehicles traveling along the same or opposite directions to pass each other. The routes 102 also include intersections 106 between different sections of the routes 102. The number of routes 102, siding sections 104, and intersections 106 shown in FIG. 1 is meant to be illustrative and not limiting on embodiments of the described subject matter. Moreover, while one or more embodiments described herein relate to a transportation network formed from railroad tracks, not all embodiments are so limited. One or more embodiments may relate to transportation networks in which vehicles other than rail vehicles travel.

Several vehicles 108 may concurrently travel along the routes 102 in the transportation network 100. In the illustrated embodiment, the vehicles 108 are shown and described herein as rail vehicles or rail vehicle consists. However, one or more other embodiments may relate to vehicles other than rail vehicles or rail vehicle consists. While four vehicles 108 are shown in FIG. 1, alternatively, a different number of vehicles 108 may be concurrently traveling in the transportation network 100. The term "vehicle" may refer to an individual component, such as an individual powered unit (e.g., a vehicle capable of self-propulsion, such as a locomotive, marine vessel, or other off-highway vehicle, or airplane, automobile, or the like), an individual non-powered unit (e.g., a vehicle incapable of self-propulsion, such as a cargo or rail car), a group of powered and/or non-powered units mechanically and/or logically linked together (e.g., a train or other rail vehicle consist or other consist, or the like).

A vehicle 108 may include a group of powered units 110 (e.g., locomotives or other vehicles capable of self-propulsion) and/or non-powered units 112 (e.g., cargo cars, passenger cars, or other vehicles incapable of self-propulsion) that are mechanically coupled or linked together to travel along the routes 102 (such a vehicle is referred to as a vehicle consist). The routes 102 are interconnected to permit the vehicles 108 to travel over various combinations of the routes 102 to move from a starting location to a destination location. In the illustrated embodiment, the vehicles 108 include control systems 114 and propulsion subsystems 116. The control systems 114 generate control signals that are used to direct operations of the vehicles 108. For example, a control system 114 on a vehicle 108 may create control signals that are used to automatically change throttle settings and/or brake settings of a propulsion subsystem 116 of the vehicle 108. Alternatively, the control system 114 can generate control signals that cause an output device, such as an electronic display, monitor, speaker, tactile device, or other device, to visually, audibly, and/or tactually present instructions to an operator of the vehicle 108 to manually change the throttle settings and/or brake settings. The propulsion subsystem 116 includes components that propel the vehicle 108, such as one or more engines, traction motors, and the like, and/or one or more components that slow, stop, or otherwise effect movement of the vehicle 108, such as one or more brakes (e.g., air brakes, dynamic brakes, and the like).

The vehicles 108 travel along the routes 102 according to a movement plan of the transportation network 100. The movement plan includes schedules for the vehicles 108 to travel. For example, the movement plan may include schedules that direct different vehicles 108 to travel to various destination locations and/or waypoints at associated times, as described above. In one embodiment, the schedule for a vehicle 108 includes a list, table, or other logical arrangement of scheduled geographic locations (e.g., Global Positioning System coordinates) within and/or outside of the transportation network 100 and associated scheduled times that the vehicle 108 is to travel to or past the corresponding locations. In one embodiment, one or more schedules may direct the vehicles 108 to take a designated path (e.g., a designated combination of sections of the routes 102) to a destination location.

The schedules can include movement events between two or more vehicles 108. A movement event includes coordinated travel of the two or more vehicles 108 at a location to avoid the vehicles 108 hitting each other or coming within a designated safety distance of each other. Examples of movement events include meet events, pass events, divergence events, and convergence events.

A meet event involves a first vehicle 108 and a second vehicle 108 concurrently traveling in opposite directions along the same route 102. The first vehicle 108 pulls off of the route 102 onto a siding section route 104 that is joined with the route 102 while the second vehicle 108 passes the first vehicle 108 on the route 102. Once the second vehicle 108 has passed, the first vehicle 108 may pull back onto the route 102 from the siding section route 104 and continue to travel along the route 102 in an opposite direction as the second vehicle 108. A meet event may be included in the schedule of the first vehicle 108 in that the schedule may direct the first vehicle 108 to travel to a location of the siding section route 104 at a scheduled time, to pull onto the siding section route 104 for a designated time period, and/or to pull back onto the route 102 at another scheduled time. The meet event may be included in the schedule of the second vehicle 108 in that the schedule may direct the second vehicle 108 to arrive at the location of the meet event (e.g., where the siding section route 104 is located) at a scheduled time (e.g., after the first vehicle 108 is scheduled to pull onto the siding section route 104) and to continue along the route 102 past the meet event.

A pass event involves a first vehicle 108 and a second vehicle 108 concurrently traveling in the same or a common direction along the same route 102. A pass event alternatively may be referred to as an overtake event or an overtaking event. The first vehicle 108 leads the second vehicle 108 along the route 102. The first vehicle 108 pulls onto a siding section route 104 and allows the second vehicle 108 to pass on the route 102. The first vehicle 108 may then pull back onto the route 102 and follow the second vehicle 108. A pass event may be included in the schedule of the first vehicle 108 in that the schedule may direct the first vehicle 108 to travel to a location of the siding section route 104 at a scheduled time, to pull onto the siding section route 104 for a designated time period, and/or to pull back onto the route 102 at another scheduled time. The pass event may be included in the schedule of the second vehicle 108 in that the schedule may direct the second vehicle 108 to arrive at the location of the pass event (e.g., the location of the siding section route 104) at a scheduled time (e.g., after the first vehicle 108 is scheduled to pull onto the siding section route 104) and to continue along the route 102 past the pass event.

A divergence event involves a first vehicle 108 and a second vehicle 108 concurrently traveling in the same direction on the same or a common route 102 that splits into two or more diverging routes 102. The first vehicle 108 may lead the second vehicle 108 and may pull off of the common route 102 onto a first route 102 of the diverging routes 102. The second vehicle 108 may pull off of the common route 102 onto a different, second route 102 of the diverging routes 102 after the first vehicle 108 has pulled onto the first diverging route 102. The divergence event may be included in the schedule of the first vehicle 108 in that the schedule may direct the first vehicle 108 to travel to the location where the common route 102 diverges into the diverging routes 102 at a scheduled time and/or to pull onto the first diverging route 102 at a scheduled time. The divergence event may be included in the schedule of the second vehicle 108 in that the schedule may direct the second vehicle 108 to travel to the location where the common route 102 diverges at a time that is later than the scheduled time of the first vehicle 108 and/or to pull onto the second diverging route 102 at a scheduled time that is later than the scheduled time of the first vehicle 108.

A convergence event involves a first vehicle 108 and a second vehicle 108 concurrently traveling on different routes 102 that converge into a common route 102, with the first and second vehicles 108 traveling toward the common route 102. The first vehicle 108 pulls onto the common route 102 ahead of the second vehicle 108 and the first and second vehicles 108 continue to travel in the same direction along the common route 102. The convergence event may be included in the schedule of the first vehicle 108 in that the schedule may direct the first vehicle 108 to pull onto the common route 102 at a scheduled time. The convergence event may be included in the schedule of the second vehicle 108 in that the schedule may direct the second vehicle 108 to pull onto the common route 102 at a later scheduled time.

The schedules and/or movement plan may be determined by a scheduling system 118. As shown in FIG. 1, the scheduling system 118 can be disposed off-board (e.g., outside) the vehicles 108. For example, the scheduling system 118 may be disposed at a central dispatch office for a railroad company. Alternatively, the scheduling system 118 can be disposed on-board one or more of the vehicles 108. The scheduling system 118 can create and communicate the schedules to the vehicles 108. For example, the scheduling system 118 can include a wireless antenna 120 (and associated transceiving equipment), such as a radio frequency (RF) or cellular antenna, that wirelessly transmits the schedules to wireless antennas 122 of the vehicles 108. The antennas 122 of the vehicles 108 may be communicatively coupled with the control systems 114 of the vehicles 108 to convey the schedules to the vehicles 108.

The schedules may be generated based on relative priorities between the vehicles 108. For example, in one embodiment, given a finite set of routes 102 in the transportation network 100 that are available for the vehicles 108 to travel along, the vehicles 108 may be prioritized such that vehicles 108 having higher priorities travel along one or more routes 102 before other vehicles 108 having lower priorities. The priorities may be based on one or more factors such as a financial value of a shipping or transportation contract related to the transport of cargo and/or passengers by the vehicles 108, sizes (e.g., weight and/or length) of the vehicles 108, distances to be traveled by the vehicles 108 to associated destination locations, geographic positions of the destination locations of the vehicles 108, and the like. The schedules may be based on the priorities by scheduling earlier arrival times for the vehicles 108 having higher priorities. In another example, the schedules may be based on the priorities by scheduling different paths along the routes 102 to the destination locations based on the priorities (e.g., by scheduling a shorter and/or more direct path for a higher priority vehicle 108 relative to a lower priority vehicle 108).

The control system 114 may form a trip plan for a trip of the vehicle 108 to travel according to the schedule of the vehicle 108. For example, the control system 114 may generate the trip plan to cause the vehicle 108 to travel to a scheduled destination location at a scheduled arrival time. The trip plan may include throttle settings, brake settings, designated speeds, or the like, of the vehicle 108 for various sections of the trip of the vehicle 108 from a current or starting location to the destination location. For example, the trip plan can include one or more velocity curves that designate various speeds of the vehicle 108 along various sections of the routes 102. The trip plan can be used by the control system 114 to determine the tractive efforts and/or braking efforts of the propulsion subsystem 116 for the trip. The control system 114 may form the control signals based on the trip plan.

In one embodiment, the trip plan is formed by the control system 114 to reduce an amount of energy (e.g., fuel) that is consumed by the vehicle 108 and/or to reduce an amount of emissions generated by the vehicle 108 as the vehicle 108 travels to the destination location associated with the received schedule. The trip plan can include throttle settings, brake settings, designated speeds, or the like, that causes the vehicle 108 to be propelled to the scheduled destination location in a manner that consumes less energy (e.g., fuel) and/or produces less emissions than if the vehicle 108 traveled to the scheduled destination location in another manner. As one example, the vehicle 108 may consume less fuel and/or produce less emissions in traveling to the destination location according to the trip plan than if the vehicle 108 traveled to the same destination location while traveling without using the trip plan, such as by traveling at another predetermined speed (e.g., a speed limit of the routes 102, which may be referred to as "track speed"). The trip plan may result in the vehicle 108 arriving at the scheduled destination later than the scheduled arrival time. For example, following the trip plan may cause the vehicle 108 to arrive later than the scheduled arrival time, but within a predetermined range of time after the scheduled arrival time.

In one embodiment, the scheduling system 118 can use the trip plans sent by the vehicles 108 as an initial guide as to where the vehicles 108 will be located at various times during travel in the transportation network 100. Based on the trip plans, the scheduling system 118 can determine whether the schedules of one or more vehicles 108 need to be updated. For example, one or more of the vehicles 108 communicate the trip plans formed by the control systems 114 to the scheduling system 118. The scheduling system 118 may examine the trip plans to determine if one or more schedules of the vehicles 108 need to be modified. For example, the trip plan of one or more vehicles 108 may result in the vehicles 108 arriving at scheduled destination locations later than the scheduled arrival times. As another example, a trip plan may cause a vehicle 108 to arrive at a movement event, such as a pass event, meet event, convergence event, and/or divergence event, later than a scheduled time. If the vehicle 108 falls sufficiently behind schedule, the vehicle 108 may not arrive at the movement event in time to avoid interfering with another vehicle 108. For example, a first vehicle 108 may be traveling behind schedule such that the first vehicle 108 may be unable or unlikely to avoid collision with, or to avoid coming within a designated safety distance from, another vehicle 108 in a movement event.

If the scheduling system 118 determines that the trip plan of one or more of the vehicles 108 will or is likely to cause interference with the movement of one or more other vehicles 108, then the scheduling system 118 may change the schedules of one or more of the vehicles 108, as described below. For example, the scheduling system 118 may delay the time that one or more vehicles 108 are scheduled to arrive at, pass, or otherwise participate in a movement event. The delayed times may cause the vehicles 108 to be able to participate in the movement event without colliding and/or coming within the designated safety distance from each other. The changes to the schedules may be communicated from the scheduling system 118 to the vehicles 108, such as prior to the vehicles 108 traveling according to the schedules or while the vehicles 108 are moving.

In one embodiment, the scheduling system 118 tracks movements of the vehicles 108 as the vehicles 108 travel according to the schedules and/or trip plans. The scheduling system 118 may monitor actual movement of the vehicles 108 in order to determine if the schedules of one or more of the vehicles 108 needs to be changed. For example, after commencing various trips of the vehicles 108, the scheduling system 118 may periodically or continuously check on current positions (e.g., geographic coordinates, distances along the routes 102 from designated reference points, and the like) and/or actual speeds of the vehicles 118 in order to determine if one or more of the vehicles 108 are significantly deviating from associated schedules. A significant deviation from a schedule may include the vehicle 108 arriving at and/or passing by a location (e.g., a waypoint, movement event, starting location, or other location) later than a scheduled time by more than a designated time threshold. For example, a vehicle 108 that arrives at or passes by a scheduled location more than 20 minutes later than a scheduled time for that location may be considered to have significantly deviated from the schedule when the time threshold is 20 minutes or less. As another example, a significant deviation from a schedule may include a vehicle 108 arriving at or passing by at least a threshold number or percentage of scheduled locations later than associated scheduled times.

The scheduling system 118 can modify the schedules of one or more vehicles 108 based on the actual movements of the vehicles 108. For example, if the scheduling system 118 determines that a vehicle 108 has significantly deviated from a schedule of the vehicle 108, then the scheduling system 118 can change the schedule of that vehicle 108 and/or one or more other vehicles 108 to account for the significant deviation. The changes to the schedules can include delaying a scheduled time and/or changing a location of a movement event, changing a scheduled arrival time at a destination location, changing the destination location, changing a path to be taken to the destination location, and the like.

When the scheduling system 118 modifies the schedules, the scheduling system 118 may communicate the modified schedules to the vehicles 108. The vehicles 108 may receive the modified schedules and the control systems 114 of the vehicles 108 can modify the trip plans of the vehicles 108. For example, based on a changed destination location, arrival time, path to be taken to the destination location, and the like, the control systems 114 may change a speed profile (e.g., one or more throttle settings and/or brake settings of the propulsion subsystems 116) so that the vehicle 108 consumes less energy and/or produces less emissions when traveling to the destination location according to the modified schedule.

The control systems 114 may then transmit the modified trip plans to the scheduling system 118 so that the scheduling systems 118 can determine whether to further modify the schedules, similar to as described above. If any schedules are modified based on the modified trip plans, the control systems 114 can modify one or more trip plans based on the modified schedules. This type of feedback loop between the scheduling system 118 and the control systems 114 can permit the scheduling system 118 and the control systems 114 to work together to coordinate the concurrent movement of several vehicles 108 in the transportation system 100 while reducing the energy consumed and/or emissions produced by the vehicles 108.

Figure 2:
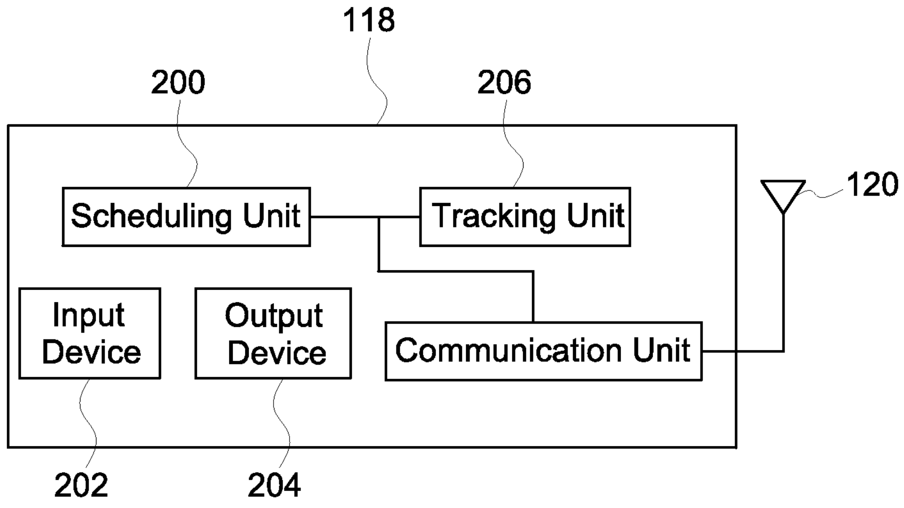
FIG. 2 is a schematic illustration of one embodiment of a scheduling system shown in FIG. 1.

FIG. 2 is a schematic illustration of one embodiment of the scheduling system 118. The scheduling system 118 includes several units that perform various operations described herein. The scheduling system 118 includes a scheduling unit 200 that generates and/or modifies the schedules of the vehicles 108 (shown in FIG. 1). As described above, the scheduling unit 200 can create the schedules based on relative priorities of the vehicles 108. Alternatively, the scheduling unit 200 can create the schedules based on a feasibility of moving the vehicles 108 to associated destination locations. For example, the scheduling unit 200 may generate the schedules so as to avoid two or more vehicles 108 occupying the same space at the same time. In another embodiment, the scheduling unit 200 can receive one or more schedules as input from an operator. For example, the scheduling system 118 may include an input device 202, such as a keyboard, microphone, touchscreen, electronic mouse, joystick, or other device, that is controlled by an operator of the scheduling system 118 to designate the schedules (or portions thereof), modify the schedules, priorities, travel restrictions (e.g., speed restrictions, horsepower restrictions, areas of the routes 102 shown in FIG. 1 over which a vehicle 108 cannot travel), and the like, for one or more vehicles 108.

The scheduling system 118 includes an output device 204, such as an electronic display, monitor, speaker, tactile device, or other device, that visually, audibly, and/or tactually notifies an operator of output information. The output information may be alarms (e.g., to notify of a significant deviation from a schedule by a vehicle 108 shown in FIG. 1), schedules of the vehicles 108, modifications to the schedules, trip plans, modifications to the trip plans, and the like.

The scheduling system 118 includes a tracking unit 206 that monitors actual movement of the vehicles 108 in the transportation system 100 (shown in FIG. 1). The tracking unit 206 may track the movement of the vehicles 108 (shown in FIG. 1) by receiving reports of location information (e.g., geographic locations and/or speeds) of the vehicles 108. For example, the vehicles 108 may, periodically or upon demand from the scheduling system 118, report the speeds of the vehicles 108 to the tracking unit 206 and the tracking unit 206 may calculate a location of the vehicles 108 based on the speeds and the times since the vehicles 108 left reference or starting locations. Alternatively, the vehicles 108 may include location determining devices 300, such as Global Positioning System (GPS) receivers, that determine locations of the vehicles 108. The vehicles 108 may then transmit the locations to the tracking unit 206. In another example, one or more devices disposed alongside the route 102 (shown in FIG. 1), such as wayside devices that detect a presence of a passing vehicle 108, can report the detection of the vehicles 108 to the tracking unit 206 as the vehicles 108 pass the devices. The tracking unit 206 may then determine locations of the vehicles 108 based on the known locations of the devices.

A communication unit 208 of the scheduling system 118 communicates with the vehicles 108 (shown in FIG. 1) and/or one or more other devices. For example, the communication unit 208 may be communicatively coupled with the antenna 120 to transmit schedules, modified schedules, modifications to schedules, and the like, to the control systems 114 of the vehicles 108. The communication unit 208 can receive information from the vehicles 108 and/or other devices, such as by receiving trip plans, modified trip plans, modifications to trip plans, speeds of the vehicles 108, locations of the vehicles 108, detection of vehicles 108 from devices alongside the routes 102, and the like. The communication unit 208 may receive such information via the antenna 120.

Figure 3:
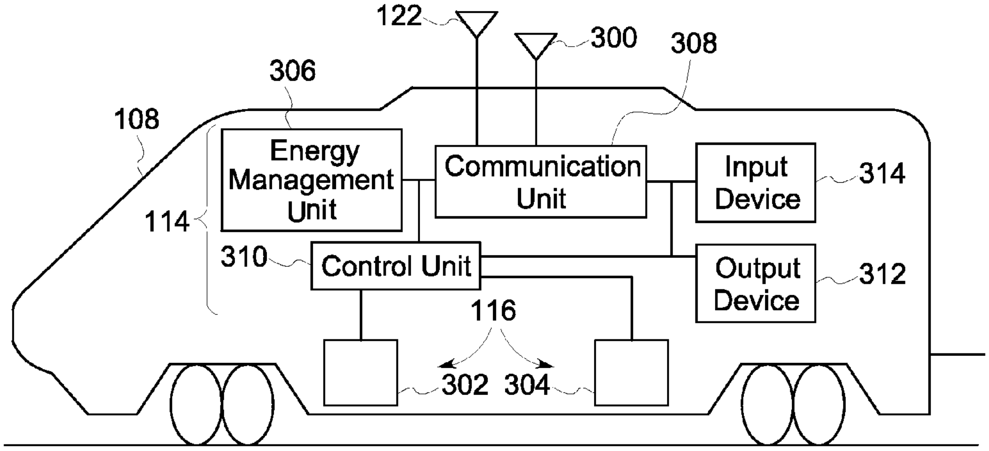
FIG. 3 is a schematic illustration of one embodiment of a vehicle shown in FIG. 1.

FIG. 3 is a schematic illustration of one embodiment of one of the vehicles 108. Several components of the vehicle 108 are shown in FIG. 3 as being connected with each other. The connections between the components are meant to represent operative or communication connections between the components. For example, the connections may represent wired and/or wireless connections, such as busses, wires, network connections, and the like. Alternatively, a connection between two or more of the components may be eliminated and the components may be included in a single component or device.

As described above, the vehicle 108 includes the control system 114, which is communicatively coupled with the propulsion subsystem 116 of the vehicle 108. As shown in FIG. 3, the propulsion subsystem 116 includes one or more motive assemblies 302 and one or more braking assemblies 304. The motive assembly 302 shown in FIG. 3 may include or represent an engine, alternator and/or generator, motors, and the like, that convert fuel into tractive effort used to propel the vehicle 108. The braking assembly 304 shown in FIG. 3 may include or represent one or more brakes, such as air brakes, dynamic brakes, and the like.

The control system 114 includes an energy management unit 306. The energy management unit 306 forms the trip plans for the vehicle 108 that are used to control operations of the propulsion subsystem 116 of the vehicle 108 during a trip of the vehicle 108. A trip of the vehicle 108 includes the travel of the vehicle 108 along the route 102 from a starting location to a scheduled destination location. The energy management unit 308 can form a trip plan for a trip of the vehicle 108 that is dictated by the schedule (or a modified schedule) received from the scheduling system 118, as described above.

In one embodiment, the energy management unit 306 includes a software application or system such as the Trip Optimizer™ system provided by General Electric Company. The energy management unit 306 can use trip data, vehicle data, route data, and/or an update to trip data, vehicle data, or route data to form a trip plan for the vehicle 108.

Trip data includes information about the path taken by the vehicle 108 to travel to a scheduled destination location. By way of example, trip data may include a trip profile of an upcoming trip of the vehicle 108 (such as information that can be used to control one or more operations of the vehicle 108, including tractive and/or braking efforts provided by the vehicle 108 during the trip), station information (such as the location of a beginning station where the upcoming trip is to begin and/or the location of an ending station where the upcoming trip is to end), restriction information (such as work zone identifications, or information on locations where the route 102 shown in FIG. 1 is being repaired or is near another route 102 being repaired and corresponding speed/throttle limitations on the vehicle 108), and/or operating mode information (such as speed/throttle limitations on the vehicle 108 in various locations, slow orders, and the like).

Vehicle data includes information about the vehicle 108 and/or cargo being carried by the vehicle 108. For example, vehicle data may represent cargo content (such as information representative of cargo being transported by the vehicle 108) and/or vehicle information (such as model numbers, manufacturers, horsepower, and the like, of the vehicle 108).

Route data includes information about the route 102 (shown in FIG. 1) upon which the vehicle 108 is to travel to reach the destination location. For example, the route data can include information about locations of damaged sections of a route 102, locations of sections of the route 102 that are under repair or construction, the curvature and/or grade of a route 102, GPS coordinates of the route 102, and the like.

The energy management unit 306 can receive at least some of the above data to form the trip plan from an off board source (e.g., a system, device, assembly, and the like, located off of the vehicle 108), such as the scheduling system 118 (shown in FIG. 1). Alternatively, the control system 114 of the vehicle 108 may receive the trip plan from the off board source.

The energy management unit 306 can communicate with a control unit 310 of the control system 114. The control unit 310 generates control signals that are used to control the tractive efforts and/or braking efforts provided by the propulsion subsystem 116 of the vehicle 108. For example, the control unit 310 can form the control signals based on the trip plan that are transmitted to the motive assemblies 302 and/or braking assemblies 304 to change the tractive efforts and/or braking efforts provided by the assemblies 302, 304. The control signals may be transmitted to the propulsion subsystem 116 to automatically control the tractive efforts and/or braking efforts. Alternatively, the control signals may be transmitted to an output device 312, such as an electronic display, monitor, speaker, tactile device, or other device, that visually, audibly, and/or tactually notifies an operator of the throttle settings, brake settings, and/or changes thereto in accordance with the trip plan.

The control system 114 includes a communication unit 308 that controls communication with the vehicle 108. For example, the communication unit 308 may be communicatively coupled with the antenna 122 to communicate with the scheduling system 118 (shown in FIG. 1) and/or other off board components. The communication unit 308 can be communicatively coupled with the location determining device 300 to determine locations and/or speeds of the vehicle 108. The communication unit 308 can receive the schedules and/or modifications to the schedules from the scheduling system 118. The communication unit 308 can transmit tracking data indicative of actual movement of the vehicle 108, such as locations and/or speeds of the vehicle 108, to the scheduling system 118, as described above. The communication unit 308 may transmit the trip plans and/or modifications to the trip plans to the scheduling system 118, also as described above.

The vehicle 108 includes an input device 314, such as a keyboard, microphone, touchscreen, electronic mouse, joystick, or other device, that is controlled by an operator of the vehicle 108 to convey information to the control system 114. For example, the operator may use the input device 314 to control throttle settings, brake settings, modify trip plans, and the like.

The scheduling system 118 (shown in FIG. 1) and the control system 114 can work together to coordinate travel of the vehicles 108 in the transportation network 100 while reducing the amounts of energy consumed by the vehicles 108 and/or the amounts of emissions generated by the vehicles 108. As described above, the scheduling system 118 may form and communicate a schedule to vehicles 108 that includes a meet event. The vehicles 108 involved in the meet event form trip plans based on the schedules.

Figure 4:
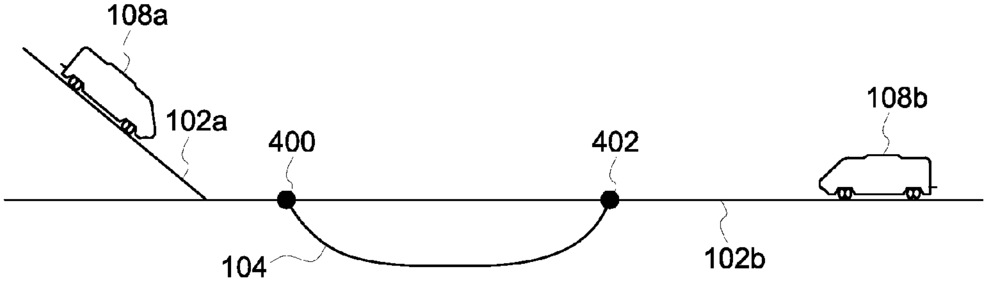
FIG. 4 illustrates a meet event between two vehicles at a first point in time and in accordance with one embodiment.
Figure 5:
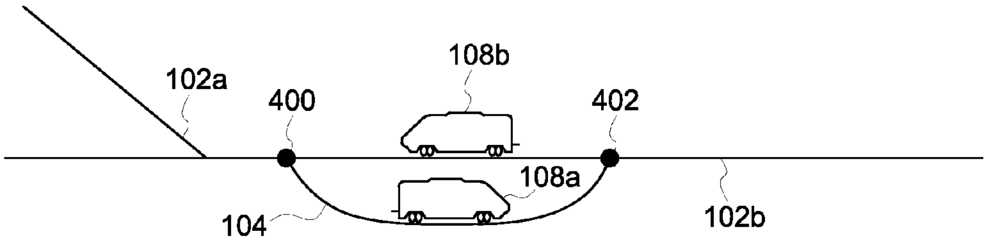
FIG. 5 illustrates the meet event of FIG. 4 at a subsequent, second point in time.
Figure 6:
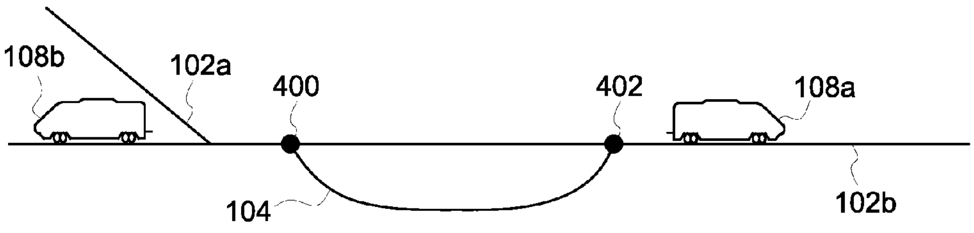
FIG. 6 illustrates the meet event of FIGS. 4 and 5 at a subsequent, third point in time.

FIGS. 4 through 6 illustrate a meet event between two vehicles 108*a*, 108*b* in accordance with one embodiment at different times during the meet event. The scheduling system 118 communicates a scheduled meet event to the vehicles 108*a*, 108*b* that involves the first vehicle 108*a* traveling from a first route 102*a* to a second route 102*b* and traveling on the second route 102*b* to the location of a siding section route 104 (as shown in FIG. 4), with the first and second vehicles 108*a*, 108*b* traveling in opposite directions on the second route 102*b*. The schedule directs the first vehicle 108*a* to pull off of the second route 102*b* and onto the siding section route 104 at a first scheduled time (as shown in FIG. 5) and at a first location 400.

The schedule of the second vehicle 108*b* directs the second vehicle 108*b* to travel to the siding section route 104 and pass by the siding section route 104 at a scheduled time that is after when the first vehicle 108*a* is scheduled to pull onto the siding section route 104 (as shown in FIG. 5). The schedule of the first vehicle 108*a* directs the first vehicle 108*a* to pull back onto the second route 102*b* after the second vehicle 108*b* has passed (as shown in FIG. 6) at a second location 402.

Figure 7:
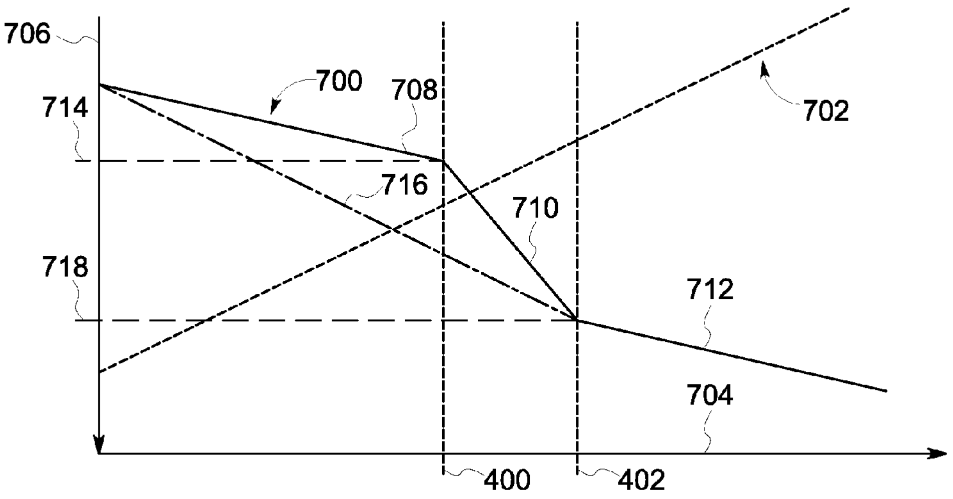
FIG. 7 illustrates speed profiles for vehicles shown in FIGS. 4 through 6 in accordance with one embodiment.
Figure 8:
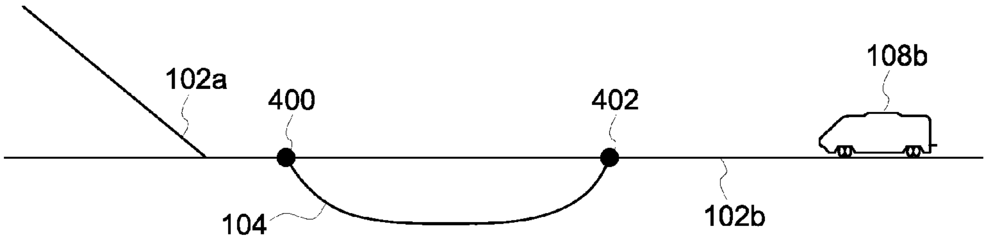
FIG. 8 illustrates a meet event between the vehicles of FIGS. 4 through 6 at a first point in time with at least one of the vehicles traveling according to a modified trip plan in accordance with one embodiment.
Figure 9:
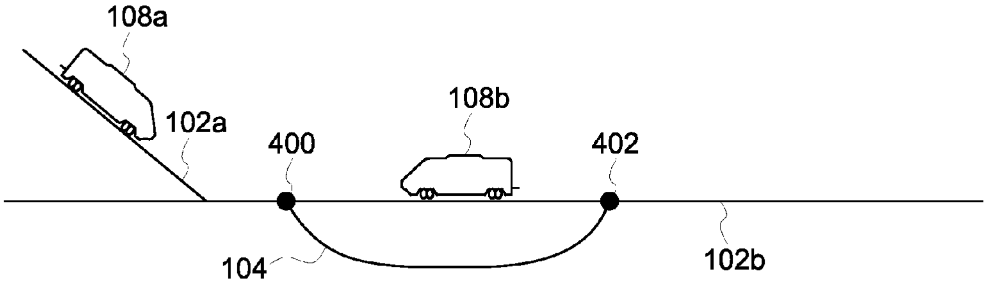
FIG. 9 illustrates the meet event of FIG. 8 at a subsequent, second point in time.
Figure 10:
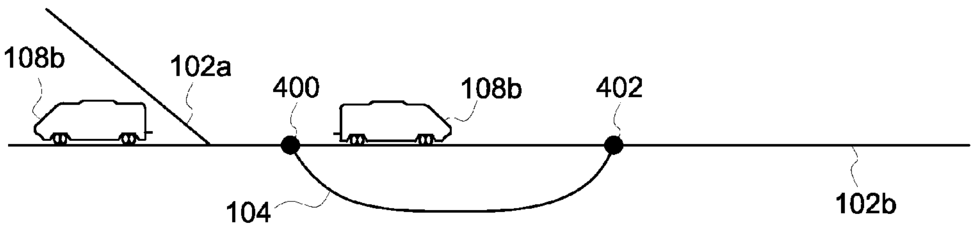
FIG. 10 illustrates the meet event of FIGS. 8 and 9 at a subsequent, third point in time.
Figure 11:
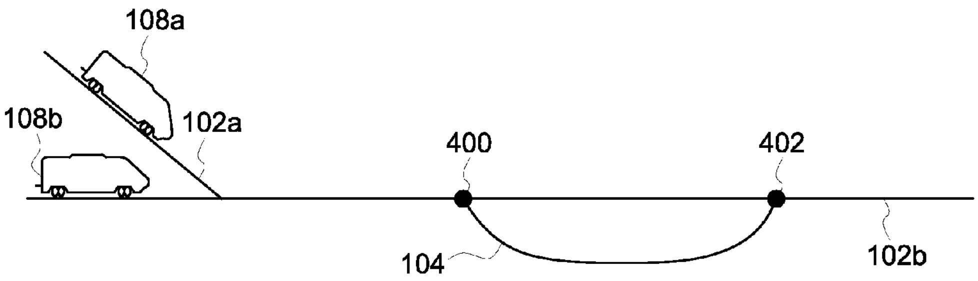
FIG. 11 illustrates a pass event between vehicles at a first point in time in accordance with one embodiment.
Figure 12:
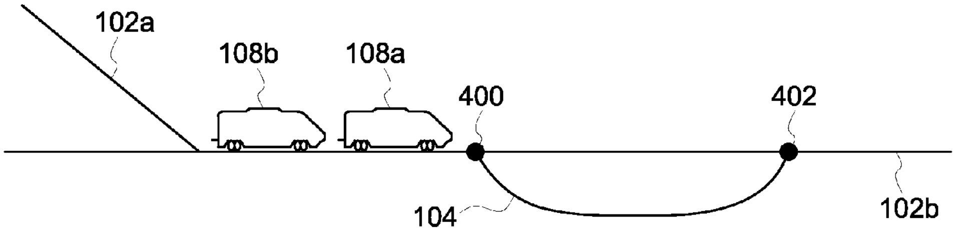
FIG. 12 illustrates the pass event of FIG. 11 at a subsequent, second point in time.

FIG. 7 illustrates speed profiles 700, 702 for the first and second vehicles 108*a*, 108*b* (shown in FIGS. 4 through 6) in accordance with one embodiment. The speed profiles 700, 702 represent speeds at which the vehicles 108*a*, 108*b* are directed to travel in order to move according to the schedules generated by the scheduling system 118 (shown in FIG. 1). The speed profiles 700, 702 are shown alongside a horizontal axis 704 representative of distance along the second route 102*b* and a vertical axis 706 representative of time. The speed profiles 700, 702 of the vehicles 108*a*, 108*b* are shown as having negative and positive slopes, respectively, due to the opposite directions of travel of the first vehicle 108*a* and the second vehicle 108*b*. In the illustrated example, a smaller slope of a speed profile 700, 702 (e.g., a smaller absolute value of the slope) indicates a faster speed of the corresponding vehicle 108*a*, 108*b* while larger slopes (e.g., larger absolute values of the slopes) indicate slower speeds.

As shown in FIG. 7, the first vehicle 108*a* travels to the first location 400 of the meet event (represented by a vertical line in FIG. 7) according to a first section 708 of the speed profile 700. The first vehicle 108*a* arrives at the first section 708 at a first scheduled time 714 and pulls onto the siding section route 104 (shown in FIGS. 4 through 6) and slows down, as shown by a second section 710 of the speed profile 700 between the first and second locations 400, 402 of the meet event. The second vehicle 108*b* approaches the meet event and passes the siding section route 104 according to the second speed profile 702, as shown in FIG. 7. After the second vehicle 108*b* has passed the siding section route 104, the first vehicle 108*a* pulls back onto the second route 102*b* at the second location 402 and continues along the second route 102*b* according to a third section 712 of the speed profile 700.

As described above, upon receiving the schedule from the scheduling system 118 (shown in FIG. 1), the control system 114 (shown in FIG. 1) of the first vehicle 108*a* may create a trip plan. The control system 114 of the first vehicle 108*a* may transmit the trip plan to the scheduling system 118 and the scheduling system 118 can use the trip plan as an initial guide to where the first vehicle 108*a* will be located at various points during the trip of the first vehicle 108*a*. In one embodiment, the trip plan may result in the first vehicle 108*a* arriving at the first location 400 of the meet event later than the first time 714. Arriving later than the first time 714 may not provide the first vehicle 108*a* with sufficient time to pull off onto the siding section route 104 before the second vehicle 108*b* arrives. The scheduling system 118 may examine the trip plan of the first vehicle 108*a* and determine that the first vehicle 108*a* will, according to the trip plan, arrive at the meet event too late (e.g., after the second vehicle 108*b* has arrived at the meet event). The scheduling system 118 can examine the trip plan by calculating when the first vehicle 108*a* will arrive at the first location 400 of the meet event based on the speed of the first vehicle 108*a* as reflected by the first section 708 of the speed profile 700 and a distance between the first vehicle 108*a* and the meet event (e.g., by dividing the distance from the starting location or a current location of the first vehicle 108*a* by the planned speed of the vehicle 108). The scheduling system 118 can determine that the first vehicle 108*a* will or is likely to arrive late to the meet event and, as a result, the scheduling system 118 may modify the schedule of the first vehicle 108*a*.

Additionally or alternatively, the scheduling system 118 may track actual movement of the first vehicle 108*a*, as described above. For example, the scheduling system 118 may monitor actual movement of the first vehicle 108*a* as the first vehicle 108*a* moves toward the meet event. Based on the monitored movements of the first vehicle 108*a*, the scheduling system 118 can determine if the first vehicle 108*a* will or is likely to arrive at the meet event later than the first time 714, similar to as described above. The scheduling system 118 can determine that the first vehicle 108*a* will or is likely to arrive late to the meet event and, as a result, the scheduling system 118 may modify the schedule of the first vehicle 108*a*.

In another embodiment, the scheduling system 118 may examine the schedules and/or trip plans of the vehicles 108*a*, 108*b* to determine if one or more movement events, such as the meet event, can be avoided. A movement event that involves the first vehicle 108*a* significantly slowing down and/or stopping while remaining in an engine idle state on the siding section route 104 can consume more energy and/or produce more emissions than the first vehicle 108*a* avoiding the movement event. For example, the scheduling system 118 may determine that the first vehicle 108*a* will or is likely to burn less fuel and/or produce fewer emissions by traveling at a slower speed to the siding section route 104 such that the first vehicle 108*a* avoids the meet event and avoids moving to the siding section route 104. The scheduling system 118 may make this determination by calculating how much fuel is consumed and/or emissions generated by the first vehicle 108*a* from previous trips of the first vehicle 108*a*, by using known relationships between fuel consumption or emission generation, the path traveled by the first vehicle 108*a*, and/or the speeds of the first vehicle 108*a*.

In one embodiment, the scheduling system 118 may change the schedule of the first vehicle 108*a* by delaying the time at which the first vehicle 108*a* is scheduled to arrive at the meet event. For example, the scheduling system 118 may push back the scheduled time of arrival of the first vehicle 108*a* at the first location 400 until after the second vehicle 108*b* has passed the siding section route 104 and is no longer traveling toward the first vehicle 108*a* on the second route 102*b*. With respect to the example shown in FIGS. 4 through 6, the scheduling system 118 may delay the arrival of the first vehicle 108*a* such that the first vehicle 108*a* does not move from the first route 102*a* onto the second route 102*b* until after the second vehicle 108*b* has passed the first route 102*a*.

As described above, the scheduling system 118 communicates the change in the schedule of the first vehicle 108*a* to the first vehicle 108*a*. In one embodiment, the scheduling system 118 sends the change in the schedule to the first vehicle 108*a* as the first vehicle 108*a* is moving toward the meet event. In the example shown in FIG. 7, the scheduling system 118 may send a delayed arrival time 718 to the first vehicle 108*a*. The first vehicle 108*a* receives the change in the schedule and may modify the trip plan of the first vehicle 108*a*. For example, the first vehicle 108*a* may change the first and second sections 708, 710 of the speed profile 700 to a modified section 716 of the speed profile 700.

With continued reference to FIG. 7, FIGS. 8 through 10 illustrate the meet event with the first vehicle 108*a* traveling according to the modified trip plan in accordance with one embodiment at different times. Travel of the first vehicle 108*a* according to the modified section 716 involves the first vehicle 108*a* traveling at a slower speed such that the first vehicle 108*a* arrives at the meet event after the second vehicle 108*b* has passed the meet location (shown in FIG. 10). For example, the first vehicle 108*a* may slow down such that the second vehicle 108*b* has passed the intersection of the first route 102*a* and the second route 102*b* before the first vehicle 108*a* pulls onto the second route 102*b* (shown in FIG. 10).

Figure 13:
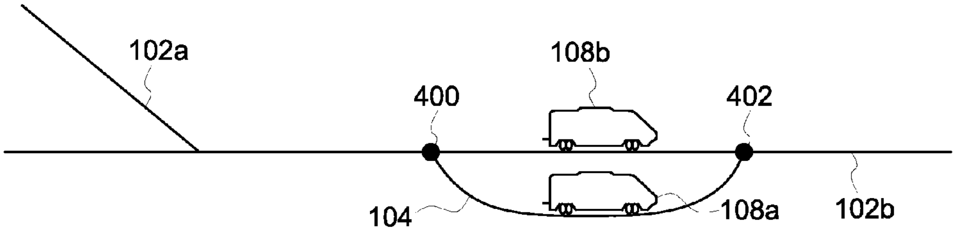
FIG. 13 illustrates the pass event of FIGS. 11 and 12 at a subsequent, third point in time.

FIGS. 11 through 14 illustrate a pass event between the vehicles 108*a*, 108*b* in accordance with one embodiment at different times during the pass event. The scheduling system 118 communicates a scheduled pass event to the vehicles 108*a*, 108*b* that involves the first vehicle 108*a* traveling from the first route 102*a* to the second route 102*b* (shown in FIGS. 11 and 12) and traveling on the second route 102*b* ahead of the second vehicle 108*b* and in the same direction (shown in FIG. 12). The schedule of the first vehicle 108*a* directs the first vehicle 108*a* to travel to the location of the siding section route 104 and to pull off of the second route 102*b* and onto the siding section route 104 at a first scheduled time (as shown in FIG. 13) and at the first location 400.

Figure 14:
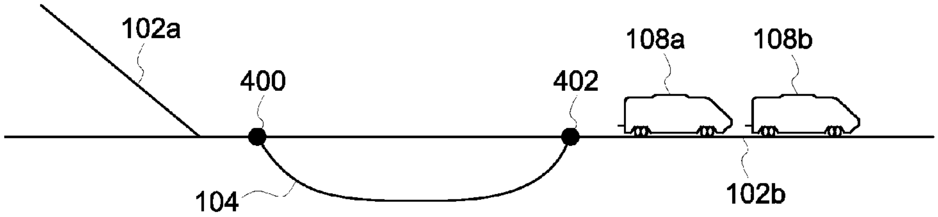
FIG. 14 illustrates the pass event of FIGS. 11 through 13 at a subsequent, fourth point in time.

The schedule of the second vehicle 108*b* directs the second vehicle 108*b* to travel to the siding section route 104 and pass by the siding section route 104 at a time that is after when the first vehicle 108*a* is scheduled to pull onto the siding section route 104 (as shown in FIG. 13). The schedule of the first vehicle 108*a* directs the first vehicle 108*a* to pull back onto the second route 102*b* after the second vehicle 108*b* has passed (as shown in FIG. 14) the second location 402.

Figure 15:
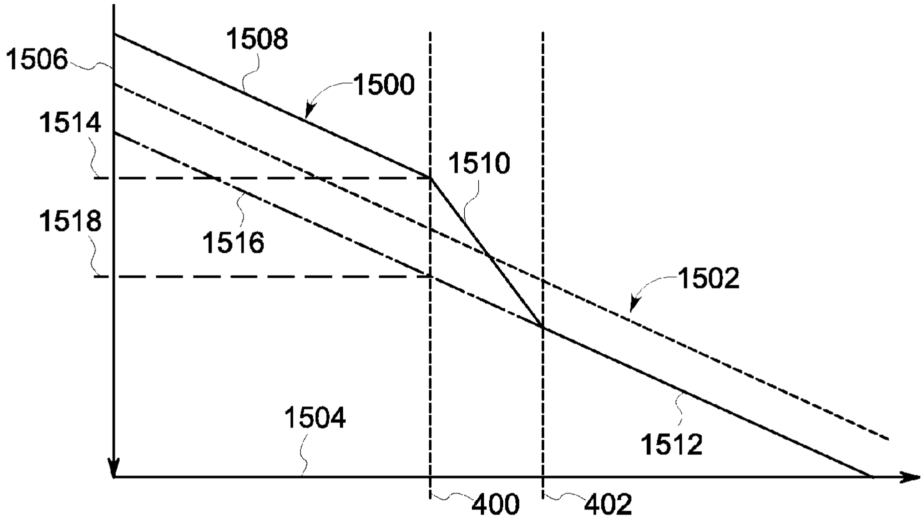
FIG. 15 illustrates speed profiles for the vehicles shown in FIGS. 11 through 14 in accordance with one embodiment.

FIG. 15 illustrates speed profiles 1500, 1502 for the first and second vehicles 108*a*, 108*b* during the pass event shown in FIGS. 11 through 14 in accordance with one embodiment. Similar to the speed profiles 700, 702 (shown in FIG. 7), the speed profiles 1500, 1502 are shown alongside a horizontal axis 1504 representative of distance along the second route 102*b* and a vertical axis 1506 representative of time. The speed profiles 1500, 1502 are shown as having negative slopes due to the same direction of travel of the first vehicle 108*a* and the second vehicle 108*b*.

As shown in FIG. 15, the first vehicle 108*a* travels to the first location 400 of the pass event according to a first section 1508 of the speed profile 1500. The first vehicle 108*a* arrives at the first section 708 at a first scheduled time 1514 and pulls onto the siding section route 104 (as shown in FIG. 13). The first vehicle 108*a* then slows down, as shown by a second section 1510 of the speed profile 1500 between the first and second locations 400, 402 of the pass event. The second vehicle 108*b* approaches the pass event and passes the siding section route 104 according to the second speed profile 1502. After the second vehicle 108*b* has passed the siding section route 104, the first vehicle 108*a* pulls back onto the second route 102*b* at the second location 402 and continues along the second route 102*b* according to a third section 1512 of the speed profile 1500.

In one embodiment, the scheduling system 118 (shown in FIG. 1) may examine the schedules, trip plans, and/or actual movements of the vehicles 108*a*, 108*b* in order to determine if the energy consumed and/or emissions generated by one or more of the vehicles 108*a*, 108*b* can be reduced. For example, the scheduling system 118 can examine the schedules and/or trip plans to determine if one or more movement events, such as a pass event, can be avoided, similar to as described above. In another example, the scheduling system 118 can monitor actual movement of the first vehicle 108*a* and may determine that, due to one or more conditions of the first vehicle 108*a*, the routes 102, or other factors, that the first vehicle 108*a* is unable to travel at the speeds directed by the trip plan of the first vehicle 108*a*. In response, the scheduling system 118 may determine that the first vehicle 108*a* can avoid the pass event by approaching the siding section route 104 slowly enough to permit the second vehicle 108*b* to pull ahead of the first vehicle 108*a* before the first vehicle 108*a* moves from the first route 102*a* to the second route 102*b*.

In one embodiment, the scheduling system 118 may change the schedule of the first vehicle 108*a* by delaying the time at which the first vehicle 108*a* is scheduled to arrive at the pass event. For example, the scheduling system 118 may push back the scheduled time of arrival of the first vehicle 108*a* at the first location 400 such that the second vehicle 108*b* has already passed the first vehicle 108*a* when the first vehicle 108*a* pulls onto the second route 102*b*. The scheduling system 118 communicates the change in the schedule of the first vehicle 108*a* to the first vehicle 108*a*. In one embodiment, the scheduling system 118 sends the change in the schedule to the first vehicle 108*a* as the first vehicle 108*a* is moving toward the movement event. In the example shown in FIG. 15, the scheduling system 118 may send a delayed arrival time 1518 to the first vehicle 108*a*. The first vehicle 108*a* receives the change in the schedule and may modify the trip plan of the first vehicle 108*a*. For example, the first vehicle 108*a* may change the first and second sections 1508, 1510 of the speed profile 1500 to a modified section 1516 of the speed profile 700.

Figure 16:
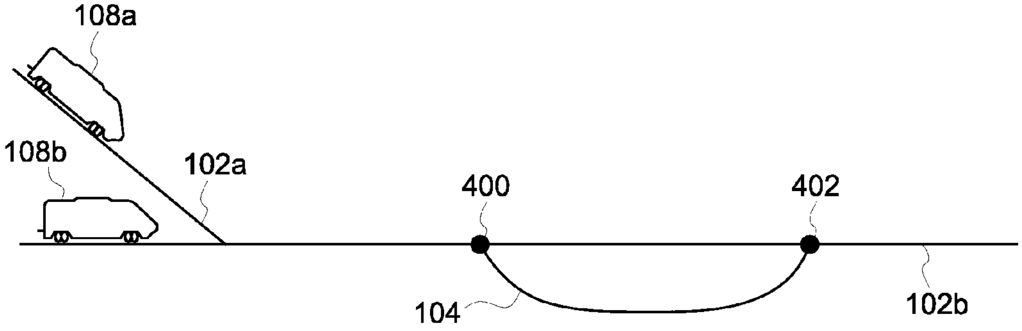
FIG. 16 illustrates a pass event between the vehicles of FIGS. 11 through 14 at a first point in time with at least one of the vehicles traveling according to a modified trip plan in accordance with one embodiment.
Figure 17:
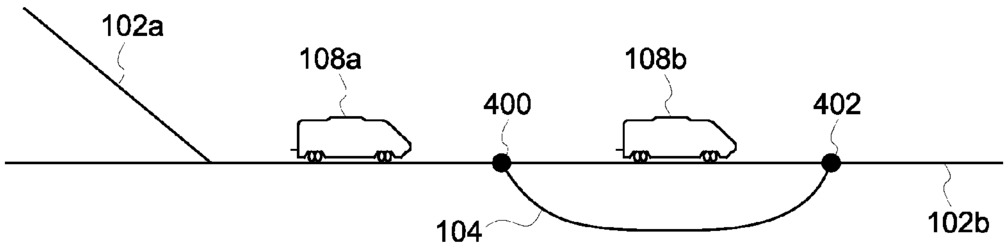
FIG. 17 illustrates the pass event of FIG. 16 at a subsequent, second point in time.

With continued reference to FIG. 15, FIGS. 16 and 17 illustrate the pass event with the first vehicle 108*a* traveling according to the modified trip plan in accordance with one embodiment at different times. Travel of the first vehicle 108*a* according to the modified section 1516 involves the first vehicle 108*a* traveling at a slower speed such that the first vehicle 108*a* pulls onto the second route 102*b* after the second vehicle 108*b* has pulled ahead of the first vehicle 108*a*, as shown in FIG. 17. For example, the first vehicle 108*a* may slow down such that the second vehicle 108*b* has passed the intersection of the first route 102*a* and the second route 102*b* before the first vehicle 108*a* pulls onto the second route 102*b*.

Figure 18:
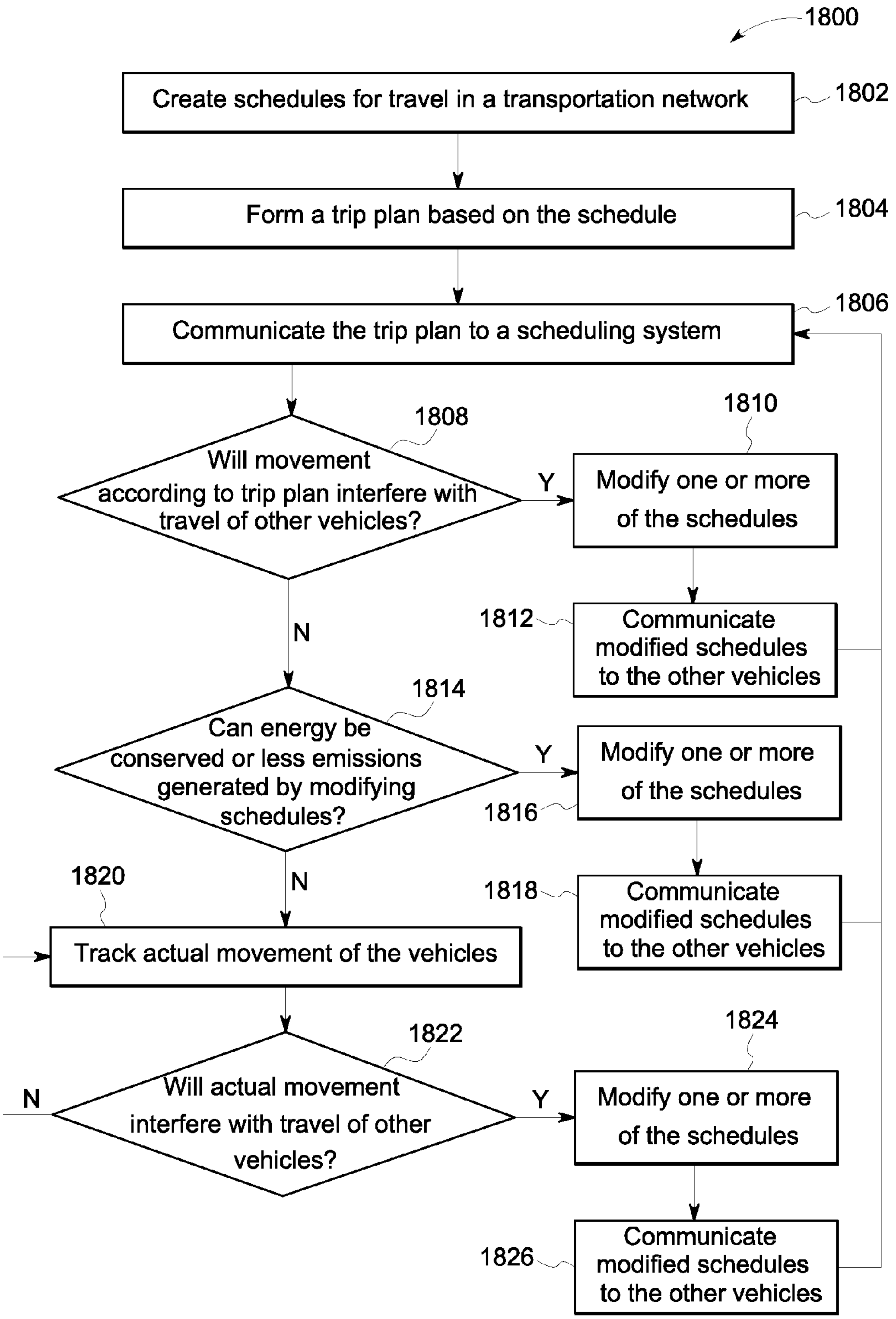
FIG. 18 is a flowchart of a method for scheduling movement of vehicles in a transportation network.

FIG. 18 is a flowchart of a method 1800 for scheduling movement of vehicles in a transportation network. The method 1800 may be used in conjunction with one or more embodiments of the scheduling system 118 (shown in FIG. 1) and/or the control systems 114 (shown in FIG. 1). For example, the method 1800 may be used to generate schedules and trip plans for the vehicles 108 (shown in FIG. 1), where the schedules and trip plans are communicated between the scheduling system 118 and the control systems 114 in a feedback loop that also may include monitoring the actual movements of the vehicles 108, and where the schedules and trip plans are modified based on each other.

At 1802, schedules are created for plural vehicles to concurrently travel in a transportation network. For example, the scheduling system 118 (shown in FIG. 1) can create schedules for the vehicles 108 (shown in FIG. 1) to travel to associated destination locations. The scheduling system 118 may coordinate travel of the vehicles 108 so that the vehicles 108 arrive at destination locations and/or travel according to relative priorities between one another. The scheduling system 118 may coordinate the schedules so that the flow of the vehicles 108 through the transportation network 100 is not significantly congested. The schedules are communicated to the vehicles 108. Alternatively, the schedules may be communicated to another system (e.g., a system disposed off-board the vehicles 108) that forms trip plans based on the schedules.

At 1804, one or more trip plans are formed based on the schedules. For example, the control systems 114 (shown in FIG. 1) may create trip plans that direct tractive efforts and/or braking efforts of the vehicles 108 (shown in FIG. 1). The trip plans may be formed so that the vehicles 108 consume less energy and/or produce fewer emissions than if the vehicles 108 traveled to scheduled destination locations without following the trip plans, as described above.

At 1806, the one or more trip plans are communicated to the scheduling system 118 (shown in FIG. 1). For example, the control systems 114 (shown in FIG. 1) may transmit the trip plans of the vehicles 108 (shown in FIG. 1) to the scheduling system 118.

At 1808, a determination is made as to whether expected movement of the vehicles 108 (shown in FIG. 1) according to the trip plans of the vehicles 108 will or is likely to result in the movement of one or more vehicles 108 being interfered with. For example, the scheduling system 118 (shown in FIG. 1) may examine the trip plans to see if travel of one or more vehicles 108 according to associated trip plans will cause the vehicles 108 to arrive too late to a movement event. As described above, a vehicle 108 may arrive late to a movement event when the vehicle 108 that is scheduled to pull onto the siding section route 104 (shown in FIG. 1) during the event after another vehicle 108 has passed the siding section route 104. If a first vehicle 108 is too late to a movement event that also involves a second vehicle 108, then the travel of the second vehicle 108 may be interfered with, such as by requiring the second vehicle 108 to slow down or stop to allow the first vehicle 108 to arrive at the movement event.

If the trip plan will result in or is likely to result in a vehicle 108 (shown in FIG. 1) interfering with the movement of one or more other vehicles 108, then the schedule of the vehicle 108 may need to be modified to avoid interfering with the movement of the one or more other vehicles 108. As a result, flow of the method 1800 may proceed to 1810. On the other hand, if the trip plan will not result in or is unlikely to result in the vehicle 108 interfering with movement of one or more other vehicles 108, then the schedule of the vehicle 108 may not need to be modified. As a result, flow of the method 1800 may continue to 1814.

At 1810, the schedules of one or more of the vehicles 108 (shown in FIG. 1) are modified. For example, the scheduling system 118 (shown in FIG. 1) may delay a scheduled time of a movement event for at least one of the vehicles 108 involved in the movement event. Delaying the time of the event may result in at least one of the vehicles 108 avoiding the event. For example, delaying an arrival time of a first vehicle 108 to a meet event or a pass event may result in a second vehicle 108 that previously was scheduled to participate in the event to pass by the first vehicle 108 before the first vehicle 108 encounters the siding section route 104 (shown in FIG. 1) to be used in the event. As a result, the vehicles 108 can avoid the movement event, and the first vehicle 108 can avoid slowing down or stopping on the siding section route 104, as described above.

At 1812, the modified schedules are communicated to the vehicles 108 (shown in FIG. 1). As described above, the modified schedules can be used by the control systems 114 (shown in FIG. 1) to change the trip plans of the vehicles 108. For example, the control systems 114 may create updated trip plans based on the delayed arrival time of one or more of the vehicles 108 at a movement event. Flow of the method 1800 may return to 106, where the trip plans are communicated to the scheduling system 118, as described above. The scheduling system 118 and control systems 114 may repeatedly generate schedules and trip plans and communicate the schedules and trip plans in a feedback loop between the scheduling system 118 and the control systems 114 in order to repeatedly update and/or modify one or more schedules and/or trip plans.

At 1814, a determination is made as to whether energy can be conserved and/or fewer emissions generated by one or more of the vehicles 108 (shown in FIG. 1) by modifying the schedules of the vehicles 108. For example, the scheduling system 118 (shown in FIG. 1) can determine if changing the schedules of one or more of the vehicles 108 to avoid a previously scheduled movement event can reduce the amount of fuel consumed by the vehicles 108 and/or reduce emissions that are generated by the vehicles 108. If the energy consumed by the vehicles 108 and/or emissions generated by the vehicles 108 can be reduced, then the schedules of the vehicles 108 may be modified to reduce the energy consumed and/or emissions generated. As a result, flow of the method 1800 proceeds to 1816. On the other hand, if the energy consumed by the vehicles 108 and/or emissions generated by the vehicles 108 cannot be reduced by changing the schedules, then the schedules of the vehicles 108 may not be modified. As a result, flow of the method 1800 proceeds to 1820.

At 1816, the schedules of one or more of the vehicles 108 (shown in FIG. 1) are modified. For example, the scheduling system 118 (shown in FIG. 1) may delay a scheduled time of a movement event for at least one of the vehicles 108 involved in the movement event, as described above. Delaying the time of the event may result in at least one of the vehicles 108 avoiding the event. Avoiding the movement event may also avoid one or more of the vehicles 108 having to slow down and/or stop for idling while waiting on a siding section route 104 (shown in FIG. 1) for another vehicle 108 to pass. The slowing down and/or idling can result in increased fuel consumption and/or emissions generated by the vehicles 108, such as during the acceleration of the vehicle 108 after slowing down and/or stopping and idling.

At 1818, the modified schedules are communicated to the vehicles 108 (shown in FIG. 1). As described above, the modified schedules can be used by the control systems 114 (shown in FIG. 1) to change the trip plans of the vehicles 108. For example, the control systems 114 may create updated trip plans based on the delayed arrival time of one or more of the vehicles 108 at a movement event. Flow of the method 1800 may return to 106, where the trip plans are communicated to the scheduling system 118 in a feedback loop, as described above.

At 1820, actual movement of the vehicles 108 (shown in FIG. 1) is tracked as the vehicles 108 move according to the schedules and/or trip plans. For example, the scheduling system 118 (shown in FIG. 1) may create schedules and use the trip plans made by the vehicles 108 based on the schedules as initial guides to where the vehicles 108 will be located at various times in the transportation network 100 (shown in FIG. 1). The scheduling system 118 can monitor actual movement of the vehicles 108 in the transportation network 100 to determine if one or more of the vehicles 108 deviate from associated schedules and/or trip plans, as described above.

At 1822, a determination is made as to whether the actual movements of the vehicles 108 (shown in FIG. 1) will or are likely to interfere with movement of one or more other vehicles 108. For example, the scheduling system 118 (shown in FIG. 1) may track movements of the vehicles 108 to determine if any factors or conditions of the vehicles 108 and/or routes 102 (shown in FIG. 1) cause or require the vehicles 108 to travel slower than the movement that is directed by the schedules and/or trip plans of the vehicles 108. Slower movement may result in interference with the travel of other vehicles 108, such as where a vehicle 108 will arrive too late to a movement event or otherwise may reduce the flow of travel in the transportation network 100.

If the actual movements of the vehicles 108 (shown in FIG. 1) will or are likely to interfere with movement of one or more other vehicles 108, then the trip plans of the vehicles 108 may need to be modified in order to avoid interfering with the other vehicles 108. As a result, flow of the method 1800 proceeds to 1824. On the other hand, if the actual movements of the vehicles 108 (shown in FIG. 1) will not or are not likely to interfere with movement of one or more other vehicles 108, then the trip plans of the vehicles 108 may not need to be modified in order to avoid interfering with the other vehicles 108. As a result, flow of the method 1800 returns to 1820, where continued movement of the vehicles 108 is monitored.

At 1824, the schedules of one or more of the vehicles 108 (shown in FIG. 1) are modified. For example, the scheduling system 118 (shown in FIG. 1) may delay a scheduled time of a movement event for at least one of the vehicles 108 involved in the movement event, as described above. Delaying the time of the event may result in at least one of the vehicles 108 avoiding the event, also as described above.

At 1826, the modified schedules are communicated to the vehicles 108 (shown in FIG. 1). As described above, the modified schedules can be used by the control systems 114 (shown in FIG. 1) to change the trip plans of the vehicles 108. Flow of the method 1800 may return to 106, where the trip plans are communicated to the scheduling system 118, as described above. The scheduling system 118 and control systems 114 may repeatedly generate schedules and trip plans and communicate the schedules and trip plans in a feedback loop between the scheduling system 118 and the control systems 114 in order to repeatedly update and/or modify one or more schedules and/or trip plans.

Figure 19:
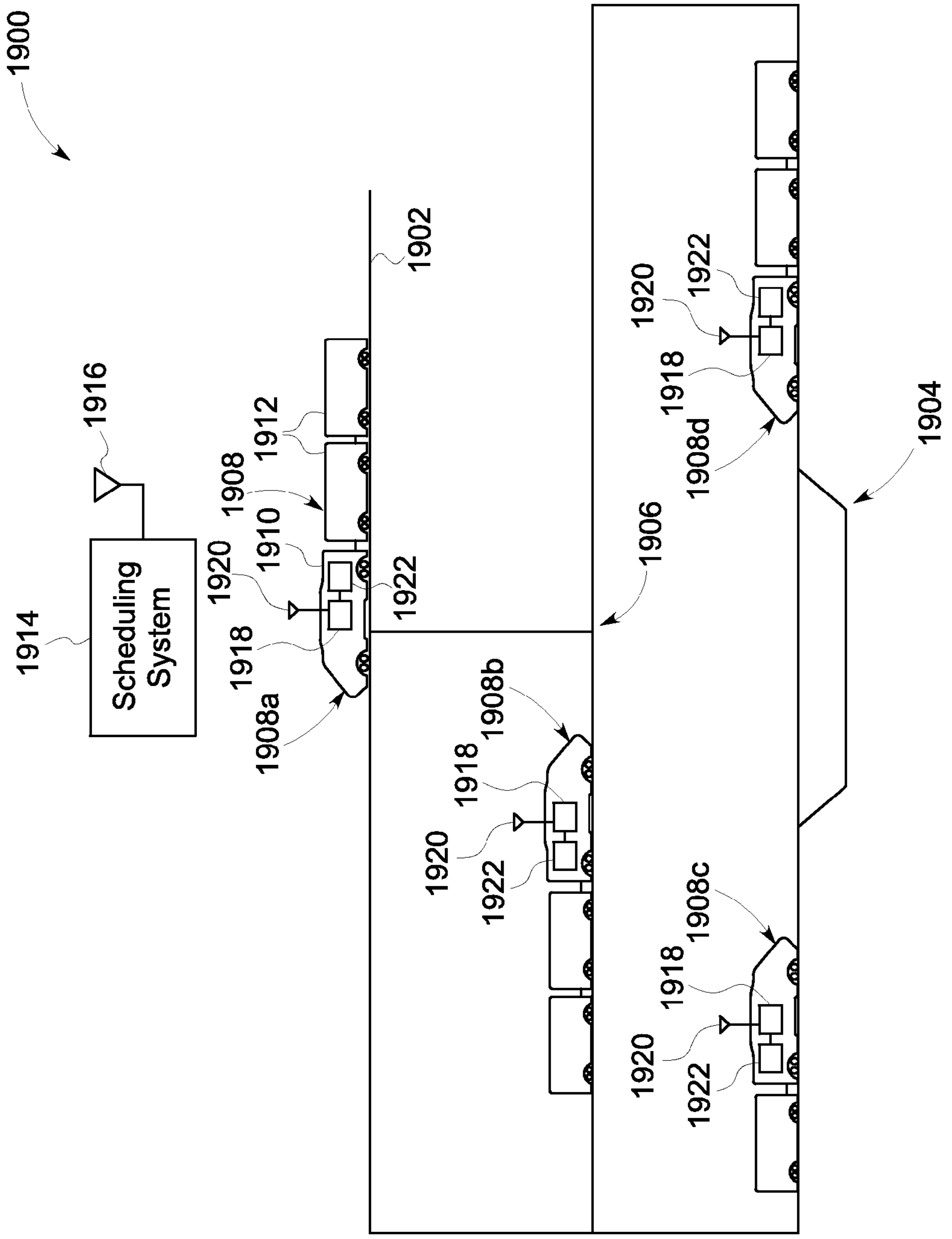
FIG. 19 is a schematic diagram of one embodiment of a transportation network.

FIG. 19 is a schematic diagram of one embodiment of a transportation network 1900. The transportation network 1900 includes a plurality of interconnected routes 1902, such as railroad tracks, roads, or other paths across which vehicles travel. The transportation network 1900 may extend over a relatively large area, such as hundreds of square miles or kilometers of land area. In the illustrated embodiment, the routes 1902 include siding sections 1904 to allow vehicles traveling along the same or opposite directions to pass each other. The routes 1902 also include intersections 1906 between different sections of the routes 1902. The number of routes 1902, siding sections 1904, and intersections 1906 shown in FIG. 19 is meant to be illustrative and not limiting on embodiments of the described subject matter. Moreover, while one or more embodiments described herein relate to a transportation network formed from railroad tracks, not all embodiments are so limited. One or more embodiments may relate to transportation networks in which vehicles other than rail vehicles travel.

Several vehicles 1908 (e.g., vehicles 1908*a-d*) may concurrently travel along the routes 1902 in the transportation network 1900. In the illustrated embodiment, the vehicles 1908 are shown and described herein as rail vehicles or rail vehicle consists. However, one or more other embodiments may relate to vehicles other than rail vehicles or rail vehicle consists. The vehicles 1908 are individually referred to by the reference numbers 1908*a*, 1908*b*, 1908*c*, and 1908*d*. While four vehicles 1908 are shown in FIG. 19, alternatively, a different number of vehicles 1908 may be concurrently traveling in the transportation network 1900. The term "vehicle" may refer to an individual component, such as an individual powered unit (e.g., a vehicle capable of self-propulsion, such as a locomotive), an individual non-powered unit (e.g., a vehicle incapable of self-propulsion, such as a cargo or rail car), a group of powered and/or non-powered units mechanically and/or logically linked together (e.g., a consist, train, or the like).

A vehicle 1908 may include a group of powered units 1910 (e.g., locomotives or other vehicles capable of self-propulsion) and/or non-powered units 1912 (e.g., cargo cars, passenger cars, or other vehicles incapable of self-propulsion) that are mechanically coupled or linked together to travel along the routes 102. The routes 102 are interconnected to permit the vehicles 1908 to travel over various combinations of the routes 102 to move from a starting location to a destination location.

The vehicles 1908 travel along the routes 102 according to a movement plan of the transportation network 1900. The movement plan coordinates movement of the vehicles 1908 in the transportation network 1900. For example, the movement plan may include schedules for the vehicles 1908 to move from a starting location or a current location to a destination location at a scheduled arrival time. In one embodiment, the movement plan includes a list, table, or other logical arrangement of scheduled geographic locations (e.g., Global Positioning System coordinates) within the transportation network 1900 and associated scheduled arrival times. The vehicles 1908 move along various paths within the transportation network 1900 to arrive at the scheduled locations at the associated scheduled arrival times. The scheduled locations in the movement plan can be referred to as "scheduled waypoints."

The movement plan may be determined by a scheduling system 1914. As shown in FIG. 199, the scheduling system 1914 can be disposed off-board (e.g., outside) of the vehicles 1908. For example, the scheduling system 1914 may be disposed at a central dispatch office for a railroad company. The scheduling system 1914 can create and communicate the schedules to the vehicles 1908. The scheduling system 1914 can include a wireless antenna 1916 (and associated transceiving equipment), such as a radio frequency (RF) or cellular antenna, that wirelessly transmits the schedules to the vehicles 1908. For example, the scheduling system 1914 may transmit destination locations and associated arrival times to the vehicles 1908.

The vehicles 1908 include control systems 1918 disposed on-board the vehicles 1908. The control systems 1918 receive the schedules from the scheduling system 1914 and generate control signals that may be used to control propulsion of the vehicles 1908 through the transportation network 1900. For example, the vehicles 1908 may include wireless antennas 1920, such as RF or cellular antennas that receive the schedules from the scheduling system 1914. On each vehicle, the wireless antenna 1920 communicates the received schedule to the control system 1918 that may be disposed on-board the vehicle 1908. The control system 1918 examines the schedule, such as by determining the scheduled destination location and scheduled arrival time, and generates control signals based on the schedule.

The control signals may be used to automatically control tractive efforts and/or braking efforts of the vehicle 1908 such that the vehicle 1908 self-propels along the routes 102 to the destination location. For example, the control system 1918 may be operatively coupled with a propulsion subsystem 1922 of the vehicle 1908. The propulsion subsystem 1922 may include motors (such as traction motors), engines, brakes (such as air brakes and/or regenerative brakes), and the like, that generate tractive energy to propel the vehicle 1908 and/or slow movement of the vehicle 1908. The control system 1918 may generate control signals that automatically control the propulsion subsystem 1922, such as by automatically changing throttle settings and/or brake settings of the propulsion subsystem 1922.

In another embodiment, the control signals may be used to prompt an operator of the vehicle 1908 to manually control the tractive efforts and/or braking efforts of the vehicle 1908. For example, the control system 1918 may include an output device, such as a computer monitor, touchscreen, acoustic speaker, or the like, that generates visual and/or audible instructions based on the control signals. The instructions may direct the operator to change throttle settings and/or brake settings of the propulsion subsystem 1922.

As described below, the control system 1918 may form a trip plan for a trip of the vehicle 1908 to travel to a scheduled destination location at a scheduled arrival time. The trip plan may include throttle settings, brake settings, designated speeds, or the like, of the vehicle 1908 for various sections of the trip of the vehicle 1908. For example, the trip plan can include one or more velocity curves that designate various speeds of the vehicle 1908 along various sections of the routes 102. The trip plan can be used by the control system 1918 to determine the tractive efforts and/or braking efforts of the propulsion subsystem 1922 for the trip. The control system 1918 may form the control signals based on the trip plan.

In one embodiment, the trip plan is formed by the control system 1918 to reduce an amount of fuel that is consumed by the vehicle 1908 as the vehicle 1908 travels to the destination location associated with the received schedule. The control system 1918 may create a trip plan having throttle settings, brake settings, designated speeds, or the like, that propels the vehicle 1908 to the scheduled destination location in a manner that consumes less fuel than if the vehicle 1908 traveled to the scheduled destination location in another manner. As one example, the vehicle 1908 may consume less fuel in traveling to the destination location according to the trip plan than if the vehicle 1908 traveled to the destination location while traveling at another predetermined speed, such as the maximum allowable speed of the routes 1902 (which may be referred to as "track speed"). The trip plan may result in the vehicle 1908 arriving at the scheduled destination later than the scheduled arrival time. For example, following the trip plan may cause the vehicle 1908 to arrive later than the scheduled arrival time, but within a predetermined range of time after the scheduled arrival time.

As the vehicles 1908 travel in the transportation network 1900, the vehicles 1908 may encounter one or more anomalies. For example, the condition of a vehicle 1908 may change (e.g., due to mechanical failure or a need for mechanical repair), the condition of a section of the route 1902 over which the vehicle 1908 is to travel may change (e.g., broken section of rail, a slow order is implemented, or the like), and/or one or more other vehicles 1908 may enter into the transportation network 1900 in such a manner as to impact the travel of the vehicle 1908. The anomalies may negatively impact travel of the vehicles 1908 according to the associated schedules. For example, with the presence or discovery of an anomaly, a vehicle 1908 may be prevented from traveling to the scheduled destination location at the scheduled arrival time.

The anomaly may be discovered by or reported to the scheduling system 1914. The scheduling system 1914 can modify the schedules of one or more of the vehicles 1908 in order to account for the anomaly. For example, the scheduling system 1914 can change the scheduled destination location, the scheduled arrival time, and/or the path to be taken by a vehicle 1908 during a trip. The scheduling system 1914 may modify an initial schedule or a previous schedule that was formed without taking the anomaly into consideration into a modified schedule that takes the anomaly into consideration. For example, an initial schedule may have a scheduled arrival time that cannot be made by a vehicle 1908 due to an anomaly while a modified schedule may include a later modified arrival time that can be made by the vehicle 1908 even with the anomaly impeding travel of the vehicle 1908.

The scheduling system 1914 transmits one or more of the modified schedules to the vehicles 1908. The control systems 1918 receive the modified schedules and can adjust control of the vehicles 1908 accordingly. For example, a control system 1918 may receive a modified schedule, form a modified trip plan based on a modified arrival time and/or a modified destination location of the modified schedule, and generate control signals to implement the modified trip plan. The vehicle 1908 may then travel in the transportation network 1900 according to the modified schedule.

Figure 20:
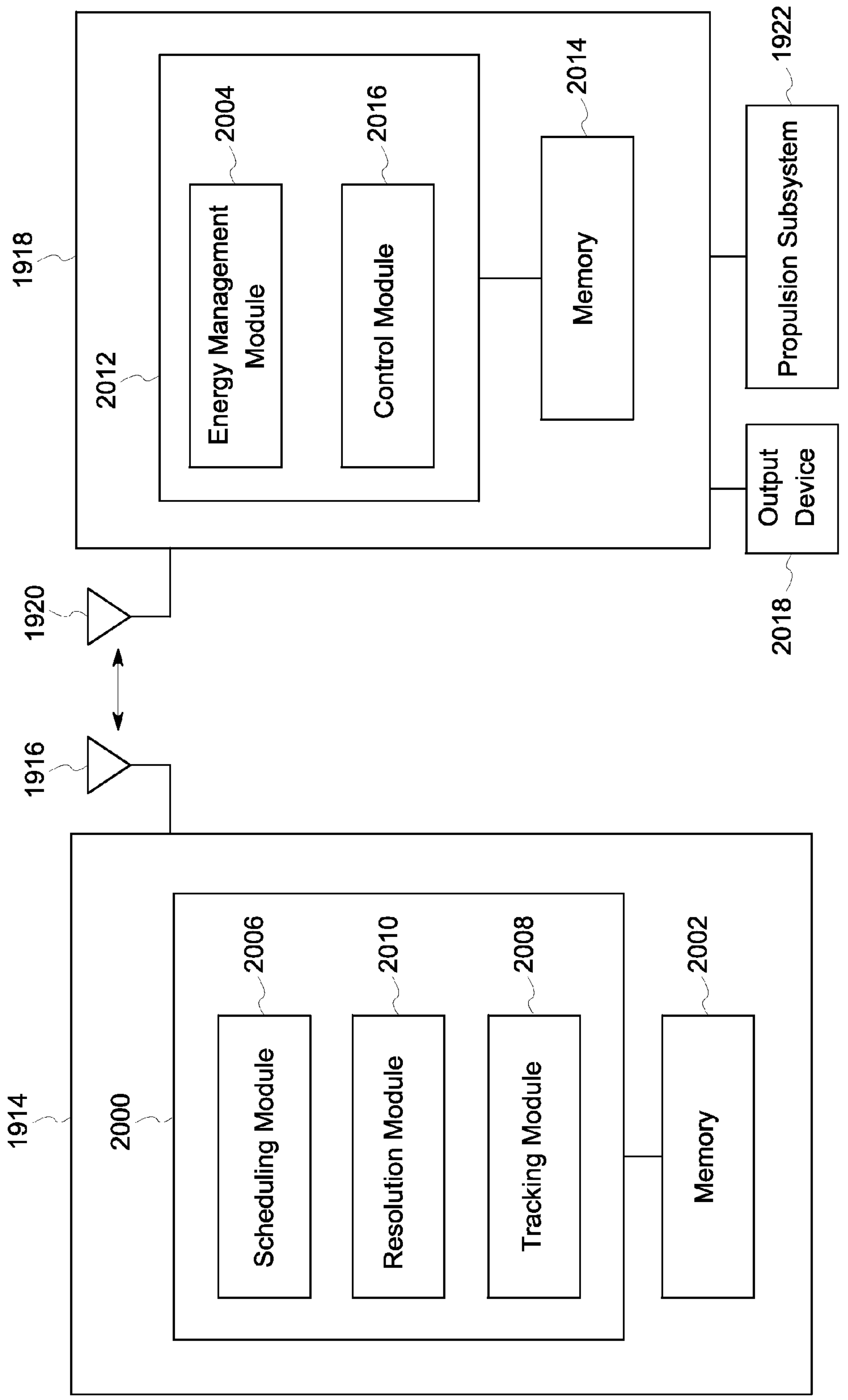
FIG. 20 is a schematic diagram of one embodiment of a scheduling system and a control system shown in FIG. 19.

FIG. 2020 is a schematic diagram of one embodiment of the scheduling system 1914 and the control system 1918. While the scheduling system 1914 is shown in FIG. 20 as communicating with a single control system 1918, in one embodiment, the scheduling system 1914 can concurrently communicate with two or more control systems 1918 disposed on-board two or more different (e.g., not mechanically coupled with each other) vehicles 1908 (shown in FIG. 199).

The scheduling system 1914 includes a controller 2000, such as a computer processor or other logic-based device that performs operations based on one or more sets of instructions (e.g., software). The instructions on which the controller 2000 operates may be stored on a tangible and non-transitory (e.g., not a transient signal) computer readable storage medium, such as a memory 202002. The memory 202002 may include one or more computer hard drives, flash drives, RAM, ROM, EEPROM, and the like. Alternatively, one or more of the sets of instructions that direct operations of the controller 2000 may be hard-wired into the logic of the controller 2000, such as by being hard-wired logic formed in the hardware of the controller 2000.

The scheduling system 1914 includes several modules that perform various operations described herein. The modules are shown as being included in the controller 2000. As described above, the modules may include hardware and/or software systems that operate to perform one or more functions, such as the controller 2000 and one or more sets of instructions. Alternatively, one or more of the modules may include a controller that is separate from the controller 2000.

The scheduling system 1914 includes a scheduling module 2006 that creates schedules for the vehicles 1908 (shown in FIG. 19). In one embodiment, the scheduling module 2006 controls communication between the scheduling system 1914 and the vehicles 1908. For example, the scheduling module 2006 may be operatively coupled with the antenna 1916 to permit the scheduling module 2006 to control transmission of data (e.g., schedules) to the vehicles 1908 and to receive data (e.g., trip plans, discovered anomalies, or the like) from the vehicles 1908. Alternatively, another module or the controller 2000 may be operatively coupled with the antenna 1916 to control communication with the vehicles 1908.

The scheduling module 2006 creates schedules for the vehicles 1908 (shown in FIG. 19). The scheduling module 2006 can form the movement plan for the transportation network 1900 (shown in FIG. 19) that coordinates the schedules of the various vehicles 1908 traveling in the transportation network 1900. For example, the scheduling module 2006 may generate initial schedules for the vehicles 1908 that are coordinated with each other. The term "initial" is not limited to just the first schedules generated for the vehicles 1908. For example, an initial schedule can include any schedule that is later modified by the scheduling system 1914, and may not necessarily be the first schedule created for a vehicle 1908.

The initial schedules of the vehicles 1908 (shown in FIG. 19) may be coordinated with each other by the scheduling module 2006 in order to maintain one or more throughput parameters of the transportation network 1900 (shown in FIG. 19). A throughput parameter can represent the flow or movement of the vehicles 1908 through the transportation network 1900 or a subset of the transportation network 1900. In one embodiment, the throughput parameter can indicate how successful the vehicles 1908 are in traveling according to the schedules associated with each of the vehicles 1908. For example, the throughput parameter can be a statistical measure of adherence by one or more of the vehicles 1908 to the schedules of the vehicles 1908 in the movement plan. The term "statistical measure of adherence" can refer to a quantity that is calculated for a vehicle 1908 and that indicates how closely the vehicle 1908 is following the schedule associated with the vehicle 1908. Several statistical measures of adherence to the movement plan may be calculated for the vehicles 1908 traveling in the transportation network 1900.

The throughput parameter may be based on or calculated from the statistical measures of adherence of the vehicles 1908 (shown in FIG. 19). In one embodiment, larger throughput parameters represent greater flow of the vehicles 1908 through the transportation network 1900, such as what may occur when a relatively large percentage of the vehicles 1908 adhere to the associated schedules and/or the amount of congestion in the transportation network 1900 are relatively low. Conversely, smaller throughput parameters may represent reduced flow of the vehicles 1908 through the transportation network 1900. The throughput parameter may reduce in value when a lower percentage of the vehicles 1908 follow the associated schedules and/or the amount of congestion in the transportation network 1900 is relatively large.

The scheduling module 2006 can create and coordinate the initial schedules of the vehicles 1908 (shown in FIG. 19) such that one or more throughput parameters of the vehicles 1908 traveling in the transportation network 1900 (shown in FIG. 19) are maintained above a predetermined non-zero threshold. For example, the scheduling module 2006 can coordinate the initial schedules such that the congestion (e.g., density per unit area over a time window) of the vehicles 1908 in one or more portions of the transportation network 1900 remains relatively low such that the flow of the vehicles 1908 in or through the transportation network 1900 is relatively high.

The scheduling system 1914 can include a tracking module 2008. The tracking module 2008 can monitor travel of the vehicles 1908 (shown in FIG. 19) in the transportation network 1900 (shown in FIG. 19). The vehicles 1908 may periodically report current positions of the vehicles 1908 to the scheduling system 1914 so that the tracking module 2008 can track where the vehicles 1908 are located. Alternatively, signals or other sensors disposed alongside the routes 1902 (shown in FIG. 19) of the transportation network 1900 can periodically report the passing of vehicles 1908 by the signals or sensors to the scheduling system 1914. The tracking module 2008 receives the locations of the vehicles 1908 in order to monitor where the vehicles 1908 are in the transportation network 1900 over time.

The tracking module 2008 may determine the throughput parameters used by the scheduling module 2006 to create and/or coordinate the schedules of the vehicles 1908 (shown in FIG. 19). The tracking module 2008 can calculate the throughput parameters based on the schedules of the vehicles 1908 and deviations from the schedules by the vehicles 1908. For example, in order to determine a statistical measure of adherence to the schedule associated with a vehicle 1908, the tracking module 2008 may monitor how closely the vehicle 1908 adheres to the schedule as the vehicle 1908 travels in the transportation network 1900 (shown in FIG. 19). The vehicle 1908 may adhere to the schedule of the vehicle 1908 by proceeding along a path toward the scheduled destination such that the vehicle 1908 will arrive at the scheduled destination at the scheduled arrival time. For example, an estimated time of arrival (ETA) of the vehicle 1908 may be calculated as the time that the vehicle 1908 will arrive at the scheduled destination if no additional anomalies occur that change the speed at which the vehicle 1908 travels. If the ETA is the same as or within a predetermined time window of the scheduled arrival time, then the tracking module 2008 may calculate a large statistical measure of adherence for the vehicle 1908. As the ETA differs from the scheduled arrival time (e.g., by occurring after the scheduled arrival time), the statistical measure of adherence may decrease.

Alternatively, the vehicle 1908 (shown in FIG. 19) may adhere to the schedule by arriving at or passing through scheduled waypoints of the schedule at scheduled times that are associated with the waypoints, or within a predetermined time buffer of the scheduled times. As differences between actual times that the vehicle 1908 arrives at or passes through the scheduled waypoints and the associated scheduled times of the waypoints increases, the statistical measure of adherence for the vehicle 1908 may decrease. Conversely, as these differences decrease, the statistical measure of adherence may increase.

The tracking module 2008 may calculate the statistical measure of adherence as a time difference between the ETA of a vehicle 1908 (shown in FIG. 19) and the scheduled arrival time of the schedule associated with the vehicle 1908. Alternatively, the statistical measure of adherence for the vehicle 1908 may be a fraction or percentage of the scheduled arrival time. For example, the statistical measure of adherence may be the fraction or percentage that the difference between the ETA and the scheduled arrival time is of the scheduled arrival time. In another example, the statistical measure of adherence may be a number of scheduled waypoints in a schedule of the vehicle 1908 that the vehicle 1908 arrives at or passes by later than the associated scheduled time or later than a time window after the scheduled time. Alternatively, the statistical measure of adherence may be a sum total, average, median, or other calculation of time differences between the actual times that the vehicle 1908 arrives at or passes by scheduled waypoints and the associated scheduled times.

The tracking module 2008 may determine the throughput parameters for the transportation network 1900 (shown in FIG. 19), or a subset thereof, based on the statistical measures of adherence associated with the vehicles 1908 (shown in FIG. 19). For example, a throughput parameter may be an average, median, or other statistical calculation of the statistical measures of adherence for the vehicles 1908 concurrently traveling in the transportation network 1900. The throughput parameter may be calculated based on the statistical measures of adherence for all, substantially all, a supermajority, or a majority of the vehicles 1908 traveling in the transportation network 1900.

Table 1 below provides examples of statistical measures of adherence of a vehicle 1908 (shown in FIG. 19) to an associated schedule in a movement plan. Table 1 includes four columns and seven rows. Table 1 represents at least a portion of a schedule of the vehicle 1908. Several tables may be calculated for different schedules of different vehicles 1908 in the movement plan for the transportation network 1900 (shown in FIG. 19). The first column provides coordinates of scheduled locations that the vehicle 1908 is to pass through or arrive at the corresponding scheduled times shown in the second column. The coordinates may be coordinates that are unique to a transportation network 1900 or that are used for several transportation networks (e.g., Global Positioning System coordinates). The numbers used for the coordinates are provided merely as examples. Moreover, information regarding the scheduled location other than coordinates may be used.

TABLE 1

| Scheduled Location (SL) | Scheduled Time | Actual Time at SL | Difference |
|---|---|---|---|
| (123.4, 567.8) | 09:00 | 09:00 | 0 |
| (901.2, 345.6) | 09:30 | 09:33 | (0:03) |
| (789.0, 234.5) | 10:15 | 10:27 | (0:12) |
| (678.9, 345.6) | 10:43 | 10:44 | (0:01) |
| (987.6, 543.2) | 11:02 | 10:58 | 0:04 |
| (109.8, 765.4) | 11:15 | 11:14 | 0:01 |
| (321.0, 987.5) | 11:30 | 11:34 | (0:04) |

The third column includes a list of the actual times that the vehicle 1908 (shown in FIG. 19) arrives at or passes through the associated scheduled location. For example, each row in Table 1 includes the actual time that the vehicle 1908 arrives at or passes through the scheduled location listed in the first column for the corresponding row. The fourth column in Table 1 includes a list of differences between the scheduled times in the second column and the actual times in the third column for each scheduled location.

The differences between when the vehicle 1908 (shown in FIG. 19) arrives at or passes through one or more scheduled locations and the time that the vehicle 1908 was scheduled to arrive at or pass through the scheduled locations may be used to calculate the statistical measure of adherence to a schedule for the vehicle 1908. In one embodiment, the statistical measure of adherence for the vehicle 1908 may represent the number or percentage of scheduled locations that the vehicle 1908 arrived too early or too late. For example, the tracking module 2008 may count the number of scheduled locations that the vehicle 1908 arrives at or passes through outside of a time buffer around the scheduled time. The time buffer can be one to several minutes. By way of example only, if the time buffer is three minutes, then the tracking module 2008 may examine the differences between the scheduled times (in the second column of Table 1) and the actual times (in the third column of Table 1) and count the number of scheduled locations that the vehicle 1908 arrived more than three minutes early or more than three minutes late.

Alternatively, the tracking module 2008 may count the number of scheduled locations that the vehicle 1908 (shown in FIG. 19) arrived early or late without regard to a time buffer. With respect to Table 1, the vehicle 1908 arrived at four of the scheduled locations within the time buffer of the scheduled times, arrived too late at two of the scheduled locations, and arrived too early at one of the scheduled locations.

The tracking module 2008 may calculate the statistical measure of adherence by the vehicle 1908 (shown in FIG. 19) to the schedule based on the number or percentage of scheduled locations that the vehicle 1908 arrived on time (or within the time buffer). In the illustrated embodiment, the tracking module 2008 can calculate that the vehicle 1908 adhered to the schedule (e.g., remained on schedule) for 57% of the scheduled locations and that the vehicle 1908 did not adhere (e.g., fell behind or ahead of the schedule) for 43% of the scheduled locations.

Alternatively, the tracking module 2008 may calculate the statistical measure of adherence by the vehicle 1908 (shown in FIG. 19) to the schedule based on the total or sum of time differences between the scheduled times associated with the scheduled locations and the actual times that the vehicle 1908 arrived at or passed through the scheduled locations. With respect to the example shown in Table 1, the tracking module 2008 may sum the time differences shown in the fourth column as the statistical measure of adherence. In the example of Table 1, the statistical measure of adherence is −15 minutes, or a total of 15 minutes behind the schedule of the vehicle 1908.

In another embodiment, the tracking module 2008 may calculate the average statistical measure of adherence by comparing the deviation of each vehicle 1908 (shown in FIG. 19) from the average or median statistical measure of adherence of the several vehicles 1908 traveling in the transportation network 1900 (shown in FIG. 19). For example, the tracking module 2008 may calculate an average or median deviation of the measure of adherence for the vehicles 1908 from the average or median statistical measure of adherence of the vehicles 1908.

The tracking module 2008 can determine the throughput parameter of the transportation network 1900 (shown in FIG. 19) based on the statistical measures of adherence for a plurality of the vehicles 1908 (shown in FIG. 19). For example, the tracking module 2008 may calculate the throughput parameter based on the statistical measure of adherence for all, substantially all, a supermajority, or a majority of the vehicles 1908 traveling in the transportation network 1900. In one embodiment, the tracking module 2008 calculates an average or median of the statistical measures of adherence for the vehicles 1908 traveling in the transportation network 1900 as the throughput parameter. However, the throughput parameter may be calculated in other ways. The throughput parameter can measured as an average or median rate of throughput or rate of travel through the transportation network 1900, such as an average or median rate at which the vehicles 1908 travel according to the associated schedules.

In one embodiment, the scheduling module 2006 may generate several different sets of potential schedules for the vehicles 1908 (shown in FIG. 19) and the tracking module 2008 may calculate throughput parameters associated with the different sets of the schedules. For example, the scheduling module 2006 may create a set of schedules for the vehicles 1904 and the tracking module 2008 may simulate travel of the vehicles 1908 according to the set of schedules. Based on the simulated travel, the tracking module 2008 may calculate a simulated throughput parameter. The tracking module 2008 may calculate additional simulated throughput parameters for additional sets of schedules. Based on a comparison between the simulated throughput parameters, the scheduling module 2006 may select a set of schedules to send to the vehicles 1908 for use in traveling in the transportation network 1900 (shown in FIG. 19). For example, the scheduling module 2006 may select the set of schedules having the largest throughput parameter, or a throughput parameter that is larger than one or more other throughput parameters associated with one or more other sets of schedules, and send the selected set of schedules to the vehicles 1908.

The vehicles 1908 (shown in FIG. 19) receive the schedules from the scheduling system 1914 and travel in the transportation network 1900 (shown in FIG. 19) in response to receiving the schedules. The vehicles 1908 may encounter one or more anomalies that prevent one or more of the vehicles 1908 from traveling according to the associated schedules. For example, one or more vehicles 1908 may experience mechanical failure that results in cessation of movement or the need to stop for repairs. As another example, one or more vehicles 1908 may travel through a section of a route 1902 (shown in FIG. 19) that is damaged or is under a slow order that requires the vehicles 1908 to slow down. The slowing down or stopping of the vehicles 1908 can prevent the vehicles 1908 from reaching the scheduled destination location at the scheduled time.

The anomalies may be detected or identified by the vehicles 1908 (shown in FIG. 19). For example, the control systems 1918 of the vehicles 1908 (shown in FIG. 19) may detect when mechanical failure of the propulsion subsystems 1922 occurs, when the vehicles 1908 slow down or stop due a mechanical failure, and/or when the vehicles 1908 slow down or stop movement due to damaged portions of the route 1902 (shown in FIG. 19) and/or for slow orders. Alternatively, external sensors disposed alongside the routes 1902 may detect mechanical failure of the vehicles 1908 (e.g., hot box detectors). In one embodiment, anomalies may be reported to the scheduling system 1914 by an external source, such as a third party system, an external sensor, or an operator inputting the presence of an anomaly into the scheduling system 1914 (e.g., using one or more input devices such as a keyboard, touchscreen, stylus, or other device operatively coupled with the scheduling system 1914). In another embodiment, the scheduling system 1914 may detect the presence of an anomaly. For example, the tracking module 2008 of the scheduling system 1914 may determine an occurrence of an anomaly when a vehicle 1908 abruptly or unexpectedly slows down or stops. The scheduling system 1914 may identify an anomaly when additional vehicles 1908 enter into the transportation network 1900 and the initial schedules sent to the vehicles 1908 were not based on the additional vehicles 1908 being in the transportation network 1900. The entrance of the additional vehicles 1908 into the transportation network 1900 may be identified based on input from an operator, data from sensors that monitor traffic in the transportation network, and the like.

The scheduling system 1914 includes a resolution module 2010 that modifies one or more of the schedules of the vehicles 1908 (shown in FIG. 19) based on the anomaly or anomalies. For example, upon detection of an anomaly that prevents one or more of the vehicles 1908 from traveling according to the initial schedules associated with the vehicles 1908, the resolution module 2010 can change the destination location and/or scheduled arrival time of one or more of the vehicles 1908. The resolution module 2010 may modify the initial schedules of the vehicles 1908 to modified schedules to account for travel delays caused by the anomalies (i.e., modifying an initial schedule results in a modified schedule). For example, if an unexpected mechanical failure of a vehicle 1908 and/or section of a route 1902 (shown in FIG. 19), a previously unknown slow order is encountered by one or more vehicles 1908, and/or one or more additional vehicles 1908 enter into the transportation network 1900 (shown in FIG. 19) and cause delays that prevent the vehicles 1908 from arriving at the destination locations at the initially scheduled arrival times, the resolution module 2010 may change the destination locations to different locations and/or the arrival times to later times.

The resolution module 2010 can modify the initial schedules based on one or more factors. In one embodiment, the resolution module 2010 changes the initial schedules to the modified schedules based on simulated throughput parameters of the transportation network 1900 (shown in FIG. 19). For example, the resolution module 2010 may modify the initial schedules while maintaining one or more throughput parameters of the transportation network 1900 above a predetermined, non-zero threshold. For example, the resolution module 2010 may generate different sets of modified schedules. The tracking module 2008 may simulate travel of the vehicles 1908 (shown in FIG. 19) in the transportation network 1900 according to the modified schedules and with the identified anomalies in the transportation network 1900. As described above, the tracking module 2008 can calculate simulated throughput parameters associated with the different sets of modified schedules. The resolution module 2010 may compare the simulated throughput parameters and, based on the comparison, select a set of modified schedules. The modified schedules in the selected set are communicated to the vehicles 1908 so that the vehicles 1908 can travel according to the modified schedules.

The resolution module 2010 can modify the initial schedules based on fuel efficiencies of the vehicles 1908 (shown in FIG. 19). For example, the resolution module 2010 may compare the fuel efficiencies of the vehicles 1908 and delay the scheduled arrival times of the vehicles 1908 by different amounts of time based on the fuel efficiency of the vehicles 1908, or how much fuel the different vehicles 1908 consume while traveling. In one embodiment, the resolution module 2010 may delay the previously scheduled arrival time for a first vehicle 1908 by a greater amount compared to a second vehicle 1908 when the first vehicle 1908 is more fuel efficient, or consumes less fuel than the second vehicle 1908 to travel over the same or a common route 1902 (shown in FIG. 19). Conversely, the resolution module 2010 may delay the scheduled arrival times for less fuel-efficient vehicles 1908 by lesser amounts of time relative to delays for more fuel-efficient vehicles 1908.

Delaying the scheduled arrival times of the more fuel-efficient vehicles 1908 by greater amounts than the less-fuel efficient vehicles 1908 can result in consuming less total fuel by the vehicles 1908. For example, delaying the scheduled arrival time of a vehicle 1908 increases the amount of time that the vehicle 1908 is consuming fuel to move toward the scheduled destination location at the delayed arrival time. As the amount of time that a less fuel-efficient vehicle 1908 is consuming fuel increases, the vehicle 1908 consumes more fuel relative to a more fuel-efficient vehicle 1908.

Modifying the schedule of one or more vehicles 1908 (shown in FIG. 19) may impact the travel of one or more other vehicles 1908 concurrently traveling in the transportation network 1900 (shown in FIG. 19). For example, delaying a scheduled arrival time of a first vehicle 1908 that passes a second vehicle 1908 in a meet event (e.g., where the first and second vehicles 1908 are traveling in opposite directions) or a pass event (e.g., where the first and second vehicles 1908 are traveling in the same direction) at a siding section 1904 (shown in FIG. 19) may cause the first vehicle 1908 to arrive too late to the meet event or pass event. As a result, the resolution module 2010 may also modify the schedules of one or more other vehicles 1908 based on the modification of the schedule of a first vehicle 1908. The other vehicles 1908 whose schedules are modified may be identified by the resolution module 2010 by determining which of the other vehicles 1908 have schedules that will cause the vehicles 1908 to intersect the route of the first vehicle 1908 and/or interact with the first vehicle 1908 (e.g., pass the first vehicle 1908, be passed by the first vehicle 1908, converge onto a common section of the routes 1902 with the first vehicle 1908 from two separate sections of the routes 1902, diverge with the first vehicle 1908 from a common section of the routes 1902 to two separate sections of the routes 1902, or the like). The resolution module 2010 can identify the other vehicles 1908 and determine which of the other vehicles 1908 interact with the first vehicle 1908 and modify the schedules of the other vehicles 1908 accordingly. For example, the resolution module 2010 may modify the schedules of several vehicles 1908 concurrently traveling in the transportation network 1900 in order to maintain the throughput parameter of the transportation network 1900 above a predetermined, non-zero threshold.

The resolution module 2010 conveys the modified schedules to the scheduling module 2006 so that the scheduling module 2006 can transmit the modified schedules to the vehicles 1908 (shown in FIG. 19). In one embodiment, the scheduling module 2006 transmits the modified schedules to the corresponding vehicles 1908 having the schedules that are modified. Alternatively, the scheduling module 2006 may transmit a plurality of the modified schedules to one or more of the vehicles 1908.

The control systems 1918 of the vehicles 1908 (shown in FIG. 19) receive the modified schedules sent by the scheduling system 1914. In the illustrated embodiment, the control system 1918 of a vehicle 1908 includes a controller 2012, such as a computer processor or other logic-based device that performs operations based on one or more sets of instructions (e.g., software). The instructions on which the controller 2012 operates may be stored on a tangible and non-transitory (e.g., not a transient signal) computer readable storage medium, such as a memory 2014. The memory 2014 may include one or more computer hard drives, flash drives, RAM, ROM, EEPROM, and the like. Alternatively, one or more of the sets of instructions that direct operations of the controller 2012 may be hard-wired into the logic of the controller 2012, such as by being hard-wired logic formed in the hardware of the controller 2012.

The control system 1918 includes several modules that perform various operations described herein. The modules are shown as being included in the controller 2012. As described above, the modules may include hardware and/or software systems that operate to perform one or more functions, such as the controller 2012 and one or more sets of instructions. Alternatively, one or more of the modules may include a controller that is separate from the controller 2012.

The control system 1918 receives the schedules from the scheduling system 1914. The controller 2012 may be operatively coupled with the antenna 1920 to receive the initial and/or modified schedules from the scheduling system 1914. In one embodiment, the schedules are conveyed to an energy management module 2004 of the control system 1918 that is disposed on-board a vehicle 1908 (shown in FIG. 19). In another embodiment, the energy management module 2004 may be disposed off-board the vehicle 1908 (shown in FIG. 19) for which the trip plan is formed. For example, the energy management module 2004 can be disposed in a central dispatch or other office that generates the trip plans for one or more vehicles 1908.

The energy management module 2004 receives the schedule sent from the scheduling system 1914 and generates a trip plan based on the schedule. As described above, the trip plan may include throttle settings, brake settings, designated speeds, or the like, of the vehicle 1908 for various sections of a scheduled trip of the vehicle 1908 to the scheduled destination location. The trip plan may be generated to reduce the amount of fuel that is consumed by the vehicle 1908 as the vehicle 1908 travels to the destination location relative to travel by the vehicle 1908 to the destination location when not abiding by the trip plan.

In order to generate the trip plan for the vehicle 1908 (shown in FIG. 19), the energy management module 2004 can refer to a trip profile that includes information related to the vehicle 1908, information related to the route 1902 (shown in FIG. 19) over which the vehicle 1908 travels to arrive at the scheduled destination, and/or other information related to travel of the vehicle 1908 to the scheduled destination location at the scheduled arrival time. The information related to the vehicle 1908 may include information regarding the fuel efficiency of the vehicle 1908 (e.g., how much fuel is consumed by the vehicle 1908 to traverse different sections of a route 1902), the tractive power (e.g., horsepower) of the vehicle 1908, the weight or mass of the vehicle 1908 and/or cargo, the length and/or other size of the vehicle 1908, the location of the powered units 1910 (shown in FIG. 19) in the vehicle 1908 (e.g., front, middle, back, or the like of a vehicle consist having several mechanically interconnected units 1910, 1912), or other information. The information related to the route 1902 to be traversed by the vehicle 1908 can include the shape (e.g., curvature), incline, decline, and the like, of various sections of the route 1902, the existence and/or location of known slow orders or damaged sections of the route 1902, and the like. Other information can include information that impacts the fuel efficiency of the vehicle 1908, such as atmospheric pressure, temperature, and the like.

The trip plan is formulated by the energy management module 2004 based on the trip profile. For example, if the trip profile requires the vehicle 1908 to traverse a steep incline and the trip profile indicates that the vehicle 1908 is carrying significantly heavy cargo, then the energy management module 2004 may form a trip plan that includes or dictates increased tractive efforts to be provided by the propulsion subsystem 1922 of the vehicle 1908. Conversely, if the vehicle 1908 is carrying a smaller cargo load and/or is to travel down a decline in the route 1902 based on the trip profile, then the energy management module 2004 may form a trip plan that includes or dictates decreased tractive efforts by the propulsion subsystem 1922 for that segment of the trip. In one embodiment, the energy management module 2004 includes a software application or system such as the Trip Optimizer™ system provided by General Electric Company.

The control system 1918 includes a control module 2016 that generates control signals for controlling operations of the vehicle 1908 (shown in FIG. 19). The control module 2016 may receive the trip plan from the energy management module 2004 and generate the control signals that automatically change the tractive efforts and/or braking efforts of the propulsion subsystem 1922 based on the trip plan. For example, the control module 2016 may form the control signals to automatically match the speeds of the vehicle 1908 with the speeds dictated by the trip plan for various sections of the trip of the vehicle 1908 to the scheduled destination location. Alternatively, the control module 2016 may form control signals that are conveyed to an output device 2018 disposed on-board the vehicle 1908. The output device 2018 can visually and/or audibly present instructions to an operator of the vehicle 1908 to change the tractive efforts and/or braking efforts of the vehicle 1908 based on the control signals. For example, the output device 2018 can visually present textual instructions to the operator to increase or decrease the speed of the vehicle 1908 to match a designated speed of the trip plan.

The energy management module 2004 can generate an initial trip plan for an initial schedule formed by the scheduling system 1914. As described above, an initial trip plan may not be limited to just the first trip plan generated for a vehicle 1908 (shown in FIG. 19). For example, an initial trip plan can include any trip plan that is later modified by the control system 1918, and may not necessarily be the first trip plan created for a vehicle 1908.

The vehicles 1908 (shown in FIG. 19) may travel according to the initial trip plans for the vehicles 1908 until one or more anomalies occur and/or are detected. As described above, when the scheduling system 1914 identifies an anomaly that prevents one or more vehicles 1908 from traveling to the corresponding scheduled destination locations at the scheduled arrival times, the scheduling system 1914 may modify the initial schedules of one or more of the vehicles 1908 to modified schedules for the one or more vehicles 1908. When the modified schedules are transmitted to the control systems 1918 of the vehicles 1908, the energy management modules 2004 may form modified trip plans based on the modified schedules.

For example, an initial trip plan for a vehicle 1908 (shown in FIG. 19) may be generated to cause the vehicle 1908 to travel to a scheduled destination at a scheduled arrival time. The anomaly or anomalies may prevent the vehicle 1908 from arriving at the scheduled destination at the scheduled arrival time and, as a result, the modified schedule provides a different destination location and/or arrival time for the vehicle 1908. The energy management module 2004 may generate a modified trip plan based on the destination location and/or arrival time of the modified schedule. The vehicle 1908 may proceed to the destination location of the modified schedule according to the modified trip plan. As described above, the trip plan (including the initial and/or modified trip plan) may cause the vehicle 1908 to travel to the destination location while reducing the amount of fuel consumed by the vehicle 1908 to travel to the destination location.

In one embodiment, the tracking module 2008 of the scheduling system 1914 may continue to monitor movement (e.g., locations and associated times) of the vehicles 1908 (shown in FIG. 19) traveling according to the modified schedules in the transportation network 1900 (shown in FIG. 19). The tracking module 2008 can monitor movements of the vehicles 1908 to determine one or more throughput parameters of the transportation network 1900 and/or to determine if an additional anomaly occurs (e.g., by abrupt, unexpected, or unplanned changes in movements of the vehicles 1908).

In one embodiment, the resolution module 2010 changes one or more of the modified schedules of the vehicles 1908 after an anomaly is removed. For example, if an anomaly that caused the resolution module 2010 to change one or more initial schedules of the vehicles 1908 to first modified schedules is removed from the transportation network 1900 (shown in FIG. 19), repaired, or otherwise corrected or eliminated, then the resolution module 2010 may again change the first modified schedules of one or more of the vehicles 1908 to second modified schedules. The second modified schedules may include updated destination locations and/or arrival times that are based on an absence of the anomaly.

Figure 21:
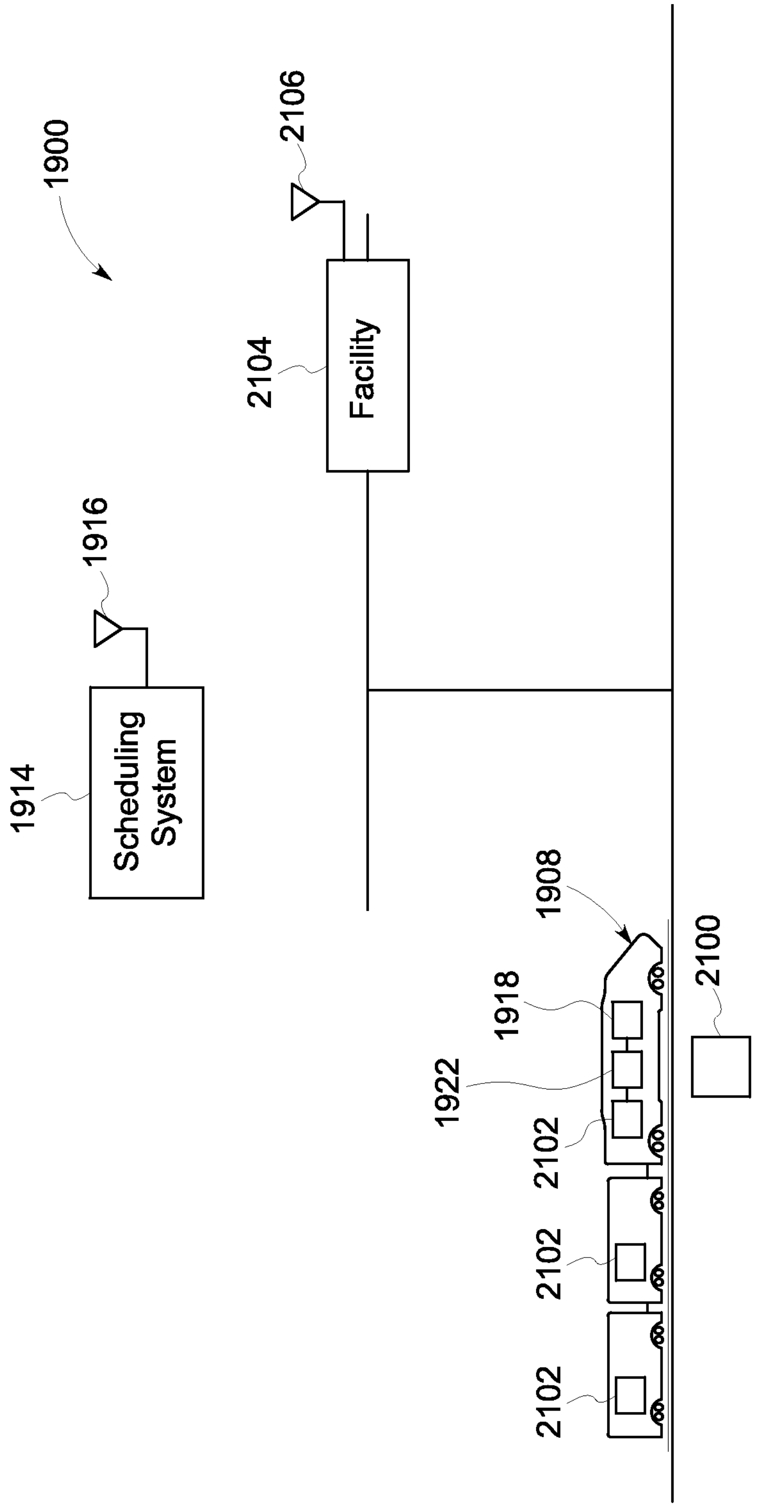
FIG. 21 is another schematic diagram of a portion of the transportation network shown in FIG. 19 in accordance with one embodiment.

FIG. 21 is another schematic diagram of a portion of the transportation network 1900 shown in FIG. 19 in accordance with one embodiment. As described above, anomalies in the transportation network 1900 may be identified or detected by the scheduling system 1914, by the vehicles 1908, and/or by off-board sensors 2100. With respect to the scheduling system 1914, an operator may use an input device to inform the scheduling system 1914 of an anomaly. The operator may inform the scheduling system 1914 of the location and/or duration of the anomaly. The scheduling system 1914 can then determine which initial schedules of the vehicles 1908 are impacted by the anomaly and change the initial schedules into the modified schedules, as described above. In another example, the scheduling system 1914 may monitor the movements of vehicles 1908 in the transportation network 1900 and, based on the movements, determine that an anomaly exists. The movements may indicate an anomaly when an unexpected or unplanned change in the movement of one or more vehicles 1908 in the transportation network 1900 change or deviate from the schedules of the vehicles 1908.

With respect to the vehicles 1908, one or more on-board sensors 2102 may be disposed on-board the vehicles 1908 to detect anomalies related to the vehicles 1908 (e.g., mechanical failure or characteristics of operation that indicate an impending mechanical failure). The on-board sensors 2102 can monitor operational characteristics of the vehicle 1908 to determine if an anomaly related to the vehicle 1908 occurs. For example, motor current signature analysis may be performed on-board the vehicles 1908 to determine if a bearing, axle, or other component of the vehicle 1908 has failed or is tending toward failure. A temperature sensor may determine if an engine or motor of the vehicle 1908 is overheating or tending toward overheating. Other types of sensors may be used as the on-board sensor 2102. If the characteristic being monitored by an on-board sensor 2102 exceeds or falls below one or more thresholds, then the characteristic may indicate that an anomaly has occurred or is about to occur.

The control system 1918 may periodically poll the sensors 2102 and/or the sensors 2102 may periodically report the monitored characteristics of the vehicle 1908 to the control system 1918. In another example, the sensors 2102 may report the characteristics to the control system 1918 when the characteristics indicate an anomaly (e.g., exceed or fall below a threshold) or a trend toward occurrence of an anomaly (e.g., the monitored characteristics are increasing or decreasing over time toward a threshold indicative of an anomaly). The control system 1918 may generate an output signal that represents detection of the anomaly. For example, the control module 2016 (shown in FIG. 20) may generate the output signal that indicates one or more characteristics of the vehicle 1908 indicate an anomaly.

The control system 1918 may transmit the output signal to one or more recipients, such as the scheduling system 1914 and/or a facility 2104 disposed off-board the vehicle 1908. For example, the control system 1918 may wirelessly transmit the output signal to the antenna 1916 of the scheduling system 1914 or to an antenna 2106 of the facility 2104. The scheduling system 1914 can receive the output signal to determine that an anomaly has occurred or is likely to occur and can modify one or more schedules of the vehicles 1908, as described above.

In one embodiment, the facility 2104 is a maintenance facility that repairs the vehicle 1908. The facility 2104 may receive the output signal and determine that the vehicle 1908 is in need of repair or maintenance. The facility 2104 can generate notifications to operators working at the facility 2104 that the vehicle 1908 is in need of repair or maintenance. The scheduling system 1914 may modify the schedule of the vehicle 1918 to arrive at the facility 2104. For example, the schedule of the vehicle 1908 may be modified such that the destination location is the location of the facility 2104 and the arrival time is a scheduled appointment for the vehicle 1908 to be repaired. The scheduling system 1914 can transmit the modified schedule to both the vehicle 1908 and the facility 2104 so that the vehicle 1908 travels to the facility 2104 for repair and so that the facility 2104 knows when to expect the vehicle 1908.

With respect to the off-board sensors 2100, one or more of the sensors 2100 may be disposed off-board the vehicles 1908 and alongside the routes 1902 in the transportation network 1900 to detect anomalies related to the vehicles 1908 and/or the route. The off-board sensors 2100 can monitor operational characteristics of the vehicle 1908 to determine if an anomaly related to the vehicle 1908 occurs. For example, the off-board sensors 2100 can include a hot box detector disposed alongside the route 1902 to monitor axle, bearing, and/or wheel temperatures of the vehicle 1908 as the vehicle 1908 passes the off-board sensor 2100. As another example, the off-board sensors 2100 can measure characteristics of the route 1902 (e.g., resistivity and/or conductivity of a railroad track) to determine if the route 1902 is broken or otherwise in need of repair. If the characteristic being monitored by an off-board sensor 2100 exceeds or falls below one or more thresholds, then the characteristic may indicate that an anomaly has occurred or is about to occur.

The scheduling system 1914 may periodically poll the off-board sensors 2100 and/or the off-board sensors 2100 may periodically report the monitored characteristics to the scheduling system 1914. In another example, the off-board sensors 2100 may report the characteristics to the scheduling system 1914 when the characteristics indicate an anomaly or a trend toward occurrence of an anomaly. The scheduling system 1914 may generate and transmit an alert signal when the anomaly is detected (e.g., when the characteristics representative of the anomaly or a trend toward an anomaly are received). For example, the tracking module 2008 (shown in FIG. 20) may create a data signal representative of the type of anomaly (e.g., related to the vehicle 1908 and/or the route 1902), the location of the anomaly, and/or a duration of the anomaly (e.g., how long the anomaly has lasted or is expected to last).

The alert signal is transmitted to one or more recipients, such as the facility 2104. As described above, in one embodiment, the scheduling system 1914 can modify the schedule of the vehicle 1908 and notify the facility 2104 via the alert signal such that the vehicle 1908 proceeds to the facility 2104 for repair. As another example, the scheduling system 1914 may transmit the alert signal to the facility 2104 such that the location of an anomaly related to the route 1902 is identified to the facility 2104. The facility 2104 can then arrange for one or more persons and/or equipment to go to the location to repair the route 1902 or otherwise remove or correct the anomaly.

Figure 22:
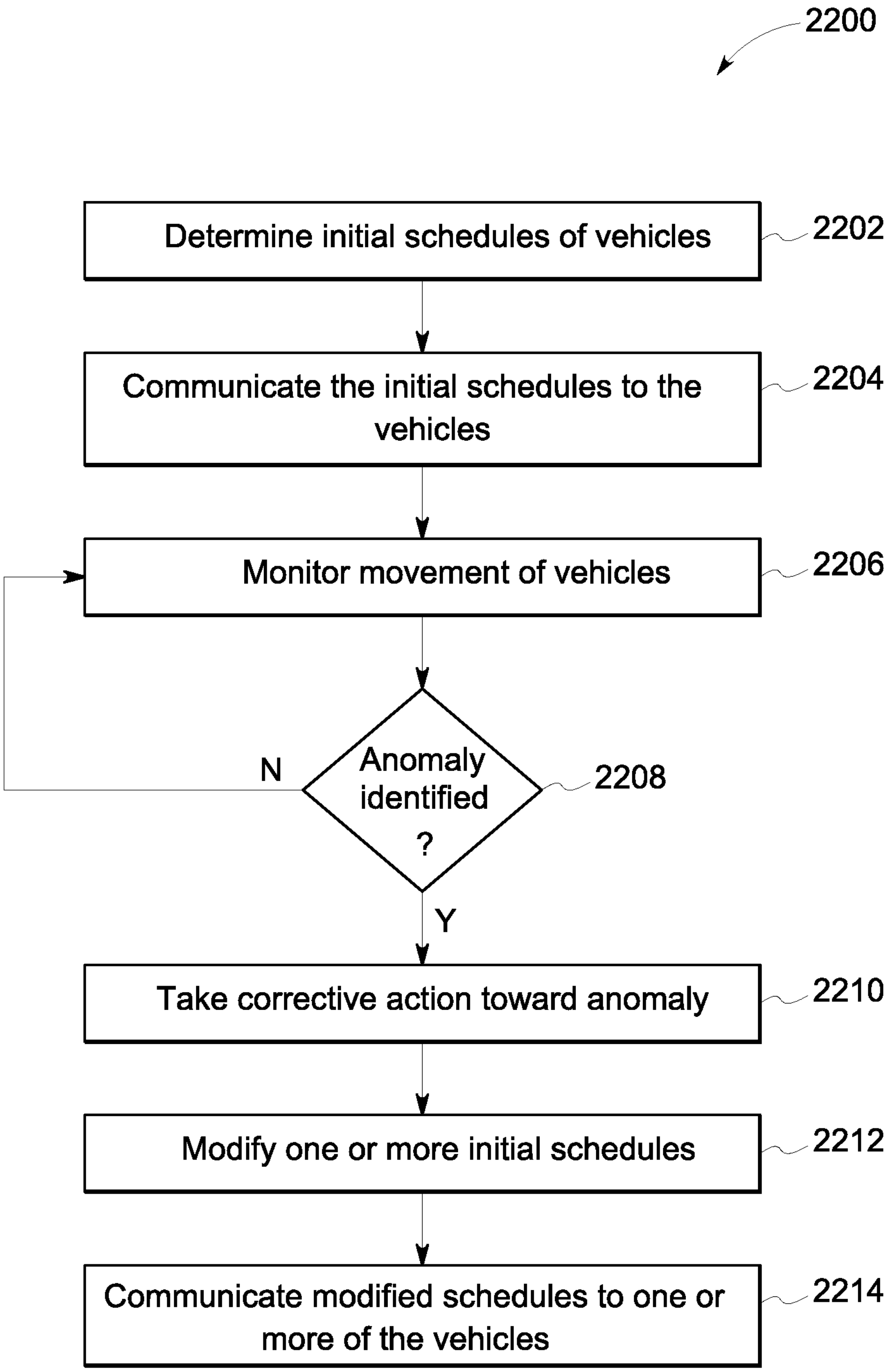
FIG. 22 is a flowchart of one embodiment of a method for modifying schedules of vehicles traveling in a transportation network.

FIG. 22 is a flowchart of one embodiment of a method 2200 for modifying schedules of vehicles traveling in a transportation network. The method 2200 may be used in conjunction with one or more of the systems described herein, such as the scheduling system 1914 (shown in FIG. 19).

At 2202, initial schedules of a plurality of vehicles 1908 (shown in FIG. 19) that are to travel concurrently in the transportation network 1900 (shown in FIG. 19) are determined. As described above, the scheduling system 1914 (shown in FIG. 19) may determine the initial schedules to maintain a throughput parameter of the transportation network 1900 above a threshold.

At 2204, the initial schedules are communicated to the vehicles 1908 (shown in FIG. 19). The initial schedules may be wirelessly transmitted to the antennas 1920 (shown in FIG. 19) of the vehicles 1908. Alternatively, the initial schedules may be transmitted to the vehicles 1908 by one or more other media, such as through a conductive pathway (e.g., a railroad track, overhead catenary, or other wire or bus). As described above, the control systems 1918 (shown in FIG. 19) may generate initial trip plans based on the initial schedules. The vehicles 1908 may travel through the transportation network 1900 (shown in FIG. 19) according to the initial trip plans.

At 2206, movement of the vehicles 1908 (shown in FIG. 19) is monitored. For example, locations and/or associated times at which the vehicles 1908 are located may be tracked to monitor where the vehicles 1908 are located.

At 2208, a determination is made as to whether one or more anomalies are identified in the transportation network 1900 (shown in FIG. 19). As described above, an anomaly may include an anomaly related to operation of one or more vehicles 1908 (shown in FIG. 19), related to one or more routes 1902 (shown in FIG. 19) of the transportation network 1900, and/or related to one or more additional vehicles entering into or passing through the transportation network 1900. Also as described above, the identified anomaly may prevent one or more of the vehicles 1908 from traveling in the transportation network 1900 according to the initial schedules of the vehicles 1908.

If an anomaly is detected, then the schedules of one or more of the vehicles 1908 (shown in FIG. 19) may need to be modified to account for the anomaly. As a result, flow of the method 2200 proceeds to 2210. On the other hand, if an anomaly is not detected, then the flow of the method 2200 may return to 2206 where movement of the vehicles 1908 continues to be monitored.

In one embodiment, at 2210, one or more corrective actions are taken to remove or otherwise remediate the detected anomaly. For example, an output signal or an alert signal may be transmitted to the facility 2104 (shown in FIG. 21) so that repair of the vehicle 1908 (shown in FIG. 19) and/or route 1902 (shown in FIG. 19) can be scheduled, prepared for, and/or performed.

At 2212, one or more of the initial schedules of the vehicles 1908 (shown in FIG. 19) are modified to account for the anomaly. For example, the scheduling system 1914 (shown in FIG. 19) may select a different destination location and/or a different arrival time for one or more of the vehicles 1908 due to the type, duration, and/or location of the anomaly. The scheduling system 1914 can form modified schedules for the vehicles 1908 based on the anomaly.

At 2214, the modified schedules are communicated to the vehicles 1908 (shown in FIG. 19). For example, the modified schedules may be transmitted to the corresponding vehicles 1908. As described above, the vehicles 1908 may form modified trip plans based on the modified schedules and travel in the transportation network 1900 (shown in FIG. 19) based on the modified trip plan.

In one embodiment, movement of the vehicles 1908 (shown in FIG. 19) continues to be monitored. If the anomaly is repaired, corrected, or otherwise removed from the transportation network 1900 (shown in FIG. 19), then the modified schedules of the vehicles 1908 may be modified again based on the absence of the anomaly from the transportation network 1900, as described above. In another embodiment, if an additional anomaly is detected, then the modified schedules may be modified again to account for the additional anomaly.

Figure 23:
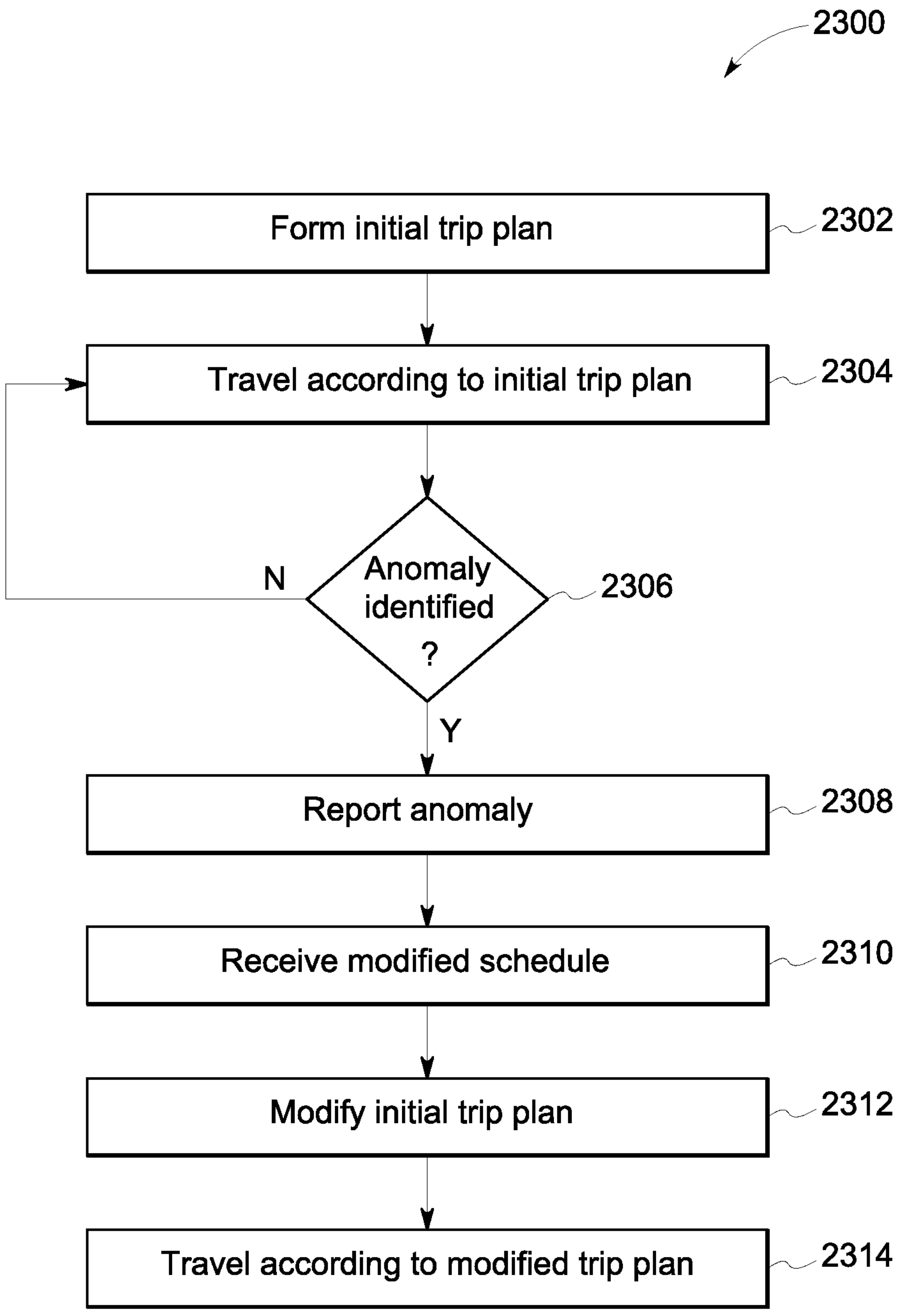
FIG. 23 is a flowchart of one embodiment of a method for traveling in a transportation network.

FIG. 23 is a flowchart of one embodiment of a method 2300 for traveling in a transportation network. The method 2300 may be used in conjunction with one or more of the systems described herein, such as the control system 1918 (shown in FIG. 19). The method 2300 is described herein as being performed by a control system 1918 of a single vehicle 1908 (shown in FIG. 19), but may be concurrently performed by a plurality of control systems 1918 in a plurality of vehicles 1908 concurrently traveling in the transportation network 1900 (shown in FIG. 19).

At 2302, an initial trip plan is formed. The initial trip plan may be created based on an initial schedule received from the scheduling system 1914 (shown in FIG. 19). As described above, the initial trip plan may dictate tractive efforts, braking efforts, speeds, or the like, of the vehicle 1908 (shown in FIG. 19) for various sections of a trip to a scheduled destination location. The trip plan can be based on a variety of information, including information related to the vehicle 1908, the route 1902 (shown in FIG. 19) along which the vehicle 1908 will travel to get to the destination location, and/or other information.

At 2304, the vehicle 1908 (shown in FIG. 19) travels toward the destination location of the initial schedule according to the initial trip plan. Traveling according to the initial trip plan may result in the vehicle 1908 consuming less fuel than the vehicle 1908 would consume if the vehicle 1908 traveled according to a different plan. In one embodiment, control signals are generated based on the initial trip plan. The control signals may automatically change settings of the propulsion subsystem 1922 (shown in FIG. 19) of the vehicle 1908 and/or may be used to generate instructions to an operator so that the operator can manually change the settings of the propulsion subsystem 1922. The settings of the propulsion subsystem 1922 are changed so that the vehicle 1908 travels according to the initial trip plan.

At 2306, a determination is made as to whether one or more anomalies are identified in the transportation network 1900 (shown in FIG. 19). As described above, an anomaly may include an anomaly related to operation of one or more vehicles 1908 (shown in FIG. 19), related to one or more routes 1902 (shown in FIG. 19) of the transportation network 1900, and/or related to one or more additional vehicles entering into or passing through the transportation network 1900. Also as described above, the identified anomaly may prevent one or more of the vehicles 1908 from traveling in the transportation network 1900 according to the initial schedules of the vehicles 1908. One or more on-board sensors 2102 disposed on-board the vehicle 1908 may detect an anomaly or a trend in operating characteristics of the vehicle 1908 that indicate the potential for an anomaly related to the vehicle 1908 to occur while the vehicle 1908 travels to the destination location.

If an anomaly is detected, then the schedule of the vehicle 1908 (shown in FIG. 19) may be modified to account for the anomaly, as described above. If the schedule of the vehicle 1908 is modified, then the initial trip plan also may need to be updated to account for a different destination location and/or arrival time of the modified schedule. In one embodiment, the anomaly may be detected by a component other than the vehicle 1908. For example, another vehicle 1908, an off-board sensor 2100, or another person or component may identify or detect the anomaly and report the anomaly to the scheduling system 1914 (shown in FIG. 19). As a result, flow of the method 2300 proceeds to 2308.

On the other hand, if an anomaly is not detected, then the flow of the method 2300 may return to 2304 where the vehicle 1908 continues to move toward the scheduled destination location according to the initial trip plan.

In one embodiment, at 2308, the anomaly is reported to an off-board location. For example, if the vehicle 1908 (shown in FIG. 19) detects the anomaly, such as an on-board sensor 2102 (shown in FIG. 21) detecting the anomaly, then the presence of the anomaly may be communicated to the scheduling system 1914 (shown in FIG. 19) and/or the facility 2104 (shown in FIG. 21). As described above, the anomaly may be reported so that the schedules of one or more vehicles 1908 may be modified and/or so that one or more corrective actions may be taken to repair, correct, or otherwise remove the anomaly from the transportation network 1900 (shown in FIG. 19).

At 2310, a modified schedule is received. As described above, one or more of the initial schedules of the vehicles 1908 (shown in FIG. 19) may be modified to account for the anomaly.

At 2312, the trip plan of the vehicle 1908 (shown in FIG. 19) is modified based on the modified schedule. For example, the initial trip plan may be changed because the destination location and/or arrival time of the modified schedule differs from the initial schedule and initial trip plan. The initial trip plan may be changed into the modified trip plan while the vehicle 1908 is moving toward the destination location of the initial schedule or the modified schedule. The vehicle 1908 may travel at a current throttle setting and/or brake setting, or at a default throttle setting and/or brake setting, while the initial trip plan is changed to the modified trip plan.

At 2314, the vehicle 1908 (shown in FIG. 19) travels to the destination location of the modified schedule based on the modified trip plan. As described above, the modified trip plan may dictate tractive efforts, braking efforts, speeds, or the like, of the vehicle 1908 (shown in FIG. 19) as the vehicle 1908 travels toward the destination location of the modified schedule. Also as described above, the schedule and/or trip plan of the vehicle 1908 may be modified more than once as the vehicle 1908 travels toward the destination location due to the detection of additional anomalies and/or the removal of previously identified anomalies from the transportation network 1900 (shown in FIG. 19).

In one embodiment, a system includes a scheduling module and a resolution module. The scheduling module is configured to determine plural initial schedules for plural different vehicles to concurrently travel in a transportation network formed from a plurality of interconnected routes. The initial schedules include one or more locations and associated times for the vehicles to travel along the routes of the transportation network. The resolution module is configured to modify at least one of the initial schedules to one or more modified schedules based on an anomaly in at least one of the vehicles or the routes that prevents one or more of the vehicles from traveling in the transportation network according to one or more of the initial schedules associated with the one or more of the vehicles. The scheduling module is configured to communicate the one or more modified schedules to one or more of the vehicles so that energy management systems disposed on the one or more of the vehicles modify travel of the one or more vehicles in the transportation network according to the one or more modified schedules.

In another aspect, the resolution module is configured to modify the at least one of the initial schedules based on the anomaly that includes a mechanical failure of the at least one of the vehicles or the routes.

In another aspect, the resolution module is configured to modify the at least one of the initial schedules based on the anomaly that includes one or more additional vehicles entering into the transportation network and the initial schedules are based on the additional vehicles being absent from the transportation network. For example, the initial schedules may be created with the expectation or assumption that the additional vehicles are not in the transportation network when the vehicles associated with the initial schedules travel in the transportation network. Alternatively, the existence of the additional vehicles may be unknown when the initial schedules are created. Then, when the additional vehicles enter into the transportation network and the vehicles with the initial schedules are impacted or may be impacted by the additional vehicles, the initial schedules may be modified to account for the additional vehicles, such as by changing paths, schedules times, destination locations, and the like, of the initial schedules, as described above.

In another aspect, the scheduling module is configured to, responsive to receiving information of the anomaly, communicate an alert signal to a maintenance facility that provides for at least one of repair, correction, or removal of the anomaly from the transportation network.

In another aspect, the resolution module is configured to receive an output signal from at least one of the vehicles that identifies the anomaly in the transportation network.

In another aspect, the resolution module is configured to identify a location of the anomaly in the transportation network based on the output signal.

In another aspect, the output signal includes information representative of one or more of a change in tractive efforts of the at least one of the vehicles, or a change in braking efforts of the at least one of the vehicles.

In another aspect, the output signal includes a notification that the at least one of the vehicles will arrive at a destination location of the initial schedule associated with the at least one of the vehicles later than an initially scheduled time.

In another aspect, the resolution module is configured to modify at least one of the initial schedules by changing one or more of a destination location or a time at which at least one of the vehicles associated with the at least one of the initial schedules is to arrive at the destination location.

In another aspect, the system also includes a tracking module configured to monitor changing locations of the vehicles in the transportation network based on at least the modified schedules of the vehicles.

In another aspect, the resolution module is configured to modify the at least one of the initial schedules to maintain a throughput parameter of the transportation network above a non-zero threshold. The throughput parameter includes a measure of adherence by the vehicles to the modified schedules as the vehicles concurrently move through the transportation network.

In another aspect, the resolution module is configured to change one or more of the modified schedules when the anomaly is removed from the transportation network and communicate the one or more modified schedules that are changed to one or more of the vehicles.

In another aspect, the scheduling module is configured to determine the initial schedules and the resolution module is configured to modify the initial schedules for rail vehicle consists traveling in the transportation network formed from interconnected tracks.

In another embodiment, another system includes an energy management module and a communication module. The energy management module is configured to generate an initial trip plan for a control unit of a first vehicle. The initial trip plan is based on an initial schedule of travel for the first vehicle in a transportation network formed from a plurality of interconnected routes. The initial trip plan is used by the control unit to control tractive efforts of the first vehicle in the transportation network. The communication module is configured to receive a modified schedule for travel of the first vehicle in the transportation network. The modified schedule is based on discovery of an anomaly in the transportation network that prevents the first vehicle from traveling in the transportation network according to the initial schedule. The energy management module is configured to change the initial trip plan to a modified trip plan based on the modified schedule and communicate the modified trip plan to the control unit to change the tractive efforts of the first vehicle.

In another aspect, the energy management module is configured to form at least one of the initial trip plan or the modified trip plan to reduce an amount of fuel consumed by the first vehicle to travel in the transportation network according to the corresponding initial schedule or the modified schedule relative to traveling in the transportation network according to a different schedule.

In another aspect, the energy management module is configured to generate the initial trip plan based on a destination location and a time at which the vehicle is to arrive at the destination location according to the initial schedule.

In another aspect, the energy management module is configured to change the initial trip plan to the modified trip plan by modifying at least one of the destination location or the time associated with the destination location.

In another aspect, the energy management module is configured to change the initial trip plan when the first vehicle discovers the anomaly in the transportation network and prior to the communication module receiving the modified schedule.

In another aspect, the communication module is configured to transmit an output signal to an off-board network scheduling system to notify the scheduling system of the anomaly when the first vehicle discovers the anomaly.

In another aspect, the communication module is configured to notify the network scheduling system of the anomaly that includes at least one of a mechanical failure of one or more other vehicles traveling in the transportation network, a mechanical failure of one or more of the routes of the transportation network, or entry of one or more other vehicles into the transportation network.

In another aspect, the communication module is configured to notify the network scheduling system of the anomaly by transmitting the output signal to the network scheduling system.

In another aspect, the output signal includes information representative of a change in the tractive efforts of the first vehicle or a change in braking efforts of the first vehicle.

In another aspect, the output signal includes a notification that the first vehicle will arrive at a destination location of the initial schedule later than an initially scheduled time.

In another aspect, the energy management module and the communication module are configured to be disposed onboard a rail vehicle consist traveling in the transportation network formed from interconnected tracks.

In another aspect, the energy management module is configured to change the modified trip plan when the anomaly is removed from the transportation network.

In another embodiment, a method includes determining plural initial schedules for plural different vehicles to concurrently travel in a transportation network formed from a plurality of interconnected routes. The initial schedules include one or more locations and associated times for the vehicles to travel along the routes of the transportation network. The method also includes identifying an anomaly in at least one of the vehicles or the routes that prevents one or more of the vehicles from traveling in the transportation network according to one or more of the initial schedules associated with the one or more of the vehicles and modifying at least one of the initial schedules to one or more modified schedules based on an anomaly. The method further includes communicating the one or more modified schedules to one or more of the vehicles so that energy management systems disposed on the one or more of the vehicles modify travel of the one or more vehicles in the transportation network according to the one or more modified schedules.

In another aspect, the method also includes communicating the initial schedules to the vehicles, and wherein modifying the at least one of the initial schedules occurs after the initial schedules are communicated to the vehicles.

In another aspect, identifying the anomaly includes one or more of: identifying a mechanical failure of the at least one of the vehicles or the routes or determining when one or more additional vehicles enter into the transportation network when the initial schedules are based on an absence of the additional vehicles from the transportation network.

In another aspect, the method also includes communicating an alert signal to a maintenance facility that provides for at least one of repair, correction, or removal of the anomaly from the transportation network.

In another aspect, the method also includes determining a location of the anomaly in the transportation network based on an output signal from at least one of the vehicles.

In another aspect, the output signal includes information representative of one or more of a change in tractive efforts of the at least one of the vehicles, a change in braking efforts of the at least one of the vehicles, or a notification that the at least one of the vehicles will arrive at a destination location of the initial schedule associated with the at least one of the vehicles later than an initially scheduled time.

In another aspect, modifying the at least one of the initial schedules includes forming the one or more modified schedules such to maintain a throughput parameter of the transportation network above a threshold. The throughput parameter includes a measure of adherence by the vehicles to the modified schedules as the vehicles concurrently move through the transportation network.

In another aspect, determining the initial schedules includes forming the initial schedules and modifying the at least one of the initial schedules includes changing the at least one of the initial schedules for rail vehicle consists traveling in the transportation network formed from interconnected tracks.

In another embodiment, another method includes generating an initial trip plan for a control unit of a first vehicle. The initial trip plan is based on an initial schedule of travel for the first vehicle in a transportation network formed from a plurality of interconnected routes. The initial trip plan is used by the control unit to control tractive efforts of the first vehicle in the transportation network. The method also includes receiving a modified schedule for travel of the first vehicle in the transportation network. The modified schedule is based on discovery of an anomaly in the transportation network that prevents the first vehicle from traveling in the transportation network according to the initial schedule. The method further includes changing the initial trip plan to a modified trip plan based on the modified schedule. The modified trip plan used by the control unit to change the tractive efforts of the first vehicle.

In another aspect, generating the initial trip plan or changing the initial trip plan includes forming the initial trip plan or the modified trip plan to reduce an amount of fuel consumed by the first vehicle to travel in the transportation network according to the corresponding initial schedule or modified schedule relative to traveling in the transportation network according to a different schedule.

In another aspect, the method also includes transmitting an output signal to an off-board network scheduling system to notify the scheduling system of the anomaly when the first vehicle discovers the anomaly.

In another aspect, transmitting the output signal includes communicating the output signal that includes information representative of a change in the tractive efforts of the first vehicle, a change in braking efforts of the first vehicle, or a notification that the first vehicle will arrive at a destination location of the initial schedule later than an initially scheduled time.

In another aspect, generating the initial trip plan and changing the initial trip plan include forming the initial trip plan and the modified trip plan for a rail vehicle consist traveling in the transportation network formed from interconnected tracks.

Embodiments of the invention relate to transportation network systems for scheduling and controlling vehicles (e.g., rail vehicles) travelling in the network. An off-board scheduling system (e.g., located at a central dispatch office) generates a movement schedule for plural vehicles in the network. For each vehicle, the movement schedule includes at least one destination and arrival time; the schedule may also include a designated route. The schedule is generated based on information of the network currently known to the scheduling system at the time the schedule is generated. The scheduling system communicates to the schedule to the plural vehicles. Based in part on the received schedule, each vehicle generates a trip plan. The trip plan is generated by an on-board energy management system, taking into account the schedule, vehicle characteristics, route characteristics, and one or more objectives, such as saving fuel or reducing emissions (versus controlling the vehicle not using the trip plan). The trip plan may be configured for control of the vehicle as described above, e.g., it establishes throttle or other vehicle fraction control settings for a plurality of points along the route, as a function of time and/or location.

Each vehicle is controlled along its respective route according to its respective trip plan. During travel, upon the occurrence and detection of an anomaly in the transportation network: (i) a vehicle trip plan may be re-planned (resulting in a modified trip plan) based on the anomaly; and/or (ii) the schedule may be re-scheduled, resulting in a modified schedule. In one aspect, the scheduling system is appraised of the anomaly before a vehicle, in which case the scheduling system generates a modified schedule, communicates the modified schedule to the vehicle, and the vehicle generates a modified trip plan, based on the modified schedule, for subsequent control of the vehicle. In another aspect, the vehicle is aware of the anomaly before receiving a modified schedule that takes into account the anomaly (and for this purpose, modified schedules may be communicated to include information about the anomaly or other reason for the modified schedule), and: (i) immediately generates a modified trip plan based on the anomaly, communicates the anomaly to the scheduling system, and generates a new modified trip plan if a modified schedule is received from the scheduling system that necessitates or warrants a new modified trip plan; or (ii) does not immediately generate a modified trip plan, but instead communicates the anomaly to the scheduling system, and generates a modified trip plan when a modified schedule is received from the scheduling system.

Thus, in an embodiment, a method for controlling a vehicle comprises a step of receiving at the vehicle an initial schedule from an off-board scheduling system, and generating an initial trip plan based in part on the initial schedule. The vehicle is controlled along a route according to the initial trip plan. The method further comprises generating a modified trip plan of the initial trip plan whenever a modified schedule is received from the scheduling system, and when the vehicle detects an anomaly associated with its travel. The method further comprises communicating the anomaly from the vehicle to the scheduling system. The method may further comprise generating the modified trip plan based on operational information of the vehicle, i.e., information relating to the vehicle in operation. In another embodiment, the method further comprises communicating information associated with a modified trip plan to the scheduling system whenever a vehicle generates a modified trip plan. In another embodiment, a modified trip plan or modified schedule is generated only if an anomaly meets one or more designated criteria. In another embodiment, different criteria are established for generating modified trip plans and generating modified schedules, that is, certain events may warrant generating a modified trip plan but not a modified schedule, and vice versa.

In another embodiment, a method is provided that includes forming a first schedule for a first vehicle to travel in a transportation network. The first schedule includes a first arrival time of the first vehicle at a scheduled location. The method also includes receiving a first trip plan for the first vehicle from an energy management system. The first trip plan is based on the first schedule and designates at least one of tractive efforts or braking efforts to be provided by the first vehicle to reduce at least one of an amount of energy consumed by the first vehicle or an amount of emissions generated by the first vehicle when the first vehicle travels through the transportation network to the scheduled location. The method further includes determining whether to modify the first schedule to avoid interfering with movement of one or more other vehicles by examining the trip plan for the first vehicle.

In another aspect, the method also includes modifying the first schedule into a different, modified second schedule based on the trip plan and communicating the modified second schedule to the first vehicle.

In another aspect, the method also includes receiving a different, modified second trip plan for the first vehicle that is based on the modified second schedule and determining whether to modify the modified second schedule based on the modified second trip plan.

In another aspect, the method also includes tracking actual movement of the first vehicle in the transportation network and modifying the first schedule of the first vehicle based on the actual movement.

In another aspect, the method also includes communicating the first schedule to the energy management system that is disposed on-board the first vehicle so that the energy management system can form the trip plan based on the first schedule.

In another aspect, the method also includes modifying the first schedule to avoid at least one of a meet event or a pass event between the first vehicle and one or more other vehicles.

In another aspect, the method also includes modifying the first schedule includes delaying a time that the first vehicle is to arrive at a siding section route for the at least one of the meet event or the pass event.

In another embodiment, a system is provided that includes a scheduling unit and a communication unit. The scheduling unit is configured to form a first schedule for a first vehicle to travel in a transportation network. The first schedule includes a first arrival time of the first vehicle at a scheduled location. The communication unit is configured to receive a first trip plan for the first vehicle from an energy management system. The first trip plan is based on the first schedule and designates at least one of tractive efforts or braking efforts to be provided by the first vehicle to reduce at least one of an amount of energy consumed by the first vehicle or an amount of emissions generated by the first vehicle when the first vehicle travels through the transportation network to the scheduled location. The scheduling unit also is configured to determine whether to modify the first schedule to avoid interfering with movement of one or more other vehicles by examining the trip plan for the first vehicle.

In another aspect, the scheduling unit is configured to modify the first schedule into a different, modified second schedule based on the trip plan and the communication unit is configured to communicate the modified second schedule to the first vehicle.

In another aspect, the communication unit is configured to receive a different, modified second trip plan for the first vehicle that is based on the modified second schedule and the scheduling unit is configured to determine whether to modify the modified second schedule based on the modified second trip plan.

In another aspect, the system also includes a tracking unit that is configured to monitor actual movement of the first vehicle in the transportation network, wherein the scheduling unit is configured to modify the first schedule of the first vehicle based on the actual movement.

In another aspect, the communication unit is configured to communicate the first schedule to the energy management system that is disposed on-board the first vehicle so that the energy management system can form the trip plan based on the first schedule.

In another aspect, the scheduling unit is configured to modify the first schedule to avoid at least one of a meet event or a pass event between the first vehicle and one or more other vehicles.

In another aspect, the scheduling unit is configured to modify the first schedule by delaying a time that the first vehicle is to arrive at a siding section route for the at least one of the meet event or the pass event.

In another embodiment, a method is provided that includes receiving a first schedule for a first vehicle to travel in a transportation network from a scheduling system. The first schedule includes a first arrival time of the first vehicle at a scheduled location. The method also includes forming a first trip plan for the first vehicle based on the first schedule. The trip plan designates at least one of tractive efforts or braking efforts to be provided by the first vehicle to reduce at least one of an amount of energy consumed by the first vehicle or an amount of emissions generated by the first vehicle when the first vehicle travels through the transportation network to the scheduled location. The method further includes communicating the first trip plan to the scheduling system so that the scheduling system can examine the first trip plan and determine whether to modify the first schedule based on the first trip plan.

In another aspect, the method also includes receiving a different, modified second schedule from the scheduling system that is based on the first trip plan and forming a different, modified second trip plan based on the modified second schedule.

In another aspect, the method also includes communicating the second trip plan to the scheduling system to enable the scheduling system to determine whether to modify the modified second schedule based on the modified second trip plan.

In another aspect, the method also includes reporting location information of the first vehicle to the scheduling system to permit the scheduling system to modify the first schedule of the first vehicle based on the location information.

In another embodiment, a system is provided that includes a communication unit and an energy management unit. The communication unit is configured to receive a first schedule for a first vehicle to travel in a transportation network from a scheduling system. The first schedule includes a first arrival time of the first vehicle at a scheduled location. The energy management unit is configured to form a first trip plan for the first vehicle based on the first schedule. The trip plan designates at least one of tractive efforts or braking efforts to be provided by the first vehicle to reduce at least one of an amount of energy consumed by the first vehicle or an amount of emissions generated by the first vehicle when the first vehicle travels through the transportation network to the scheduled location. The communication unit also is configured to communicate the first trip plan to the scheduling system so that the scheduling system can examine the first trip plan and determine whether to modify the first schedule based on the first trip plan.

In another aspect, the communication unit is configured to receive a different, modified second schedule from the scheduling system that is based on the first trip plan and the energy management unit is configured to form a different, modified second trip plan based on the modified second schedule.

In another aspect, the communication unit is configured to communicate the second trip plan to the scheduling system to enable the scheduling system to determine whether to modify the modified second schedule based on the modified second trip plan.

In another aspect, the system also includes a location determining device configured to determine location information of the first vehicle to permit the scheduling system to modify the first schedule of the first vehicle based on the location information.

Another embodiment relates to a method comprising, at plural vehicles in a transportation network, receiving plural respective first schedules from an off-board location. The method further comprises transmitting plural respective initial trip plans from the plural vehicles to the off-board location responsive to the plural respective first schedules, and receiving plural respective modified schedules at the plural vehicles from the off-board location responsive to the plural respective initial trip plans. The method may further comprise, at the vehicles, generating plural respective modified trip plans, for controlling the vehicles, based on the modified schedules.

In another embodiment, a method comprises generating, with an energy management system disposed onboard a first vehicle, a first trip plan using a first schedule that is received by the first vehicle. The energy management system can include one or more hardware circuits or circuitry that include and/or are connected with one or more computer processors. The first trip plan dictates first operational settings of the first vehicle as a function of at least one of time or distance traveled along one or more routes. The first schedule is for the first vehicle to travel in a transportation network (comprising the one or more routes), and is formed off-board the first vehicle at an off-board scheduling system and communicated to the first vehicle. The off-board scheduling system can include one or more hardware circuits or circuitry that include and/or are connected with one or more computer processors. The method further comprises monitoring actual movement of the first vehicle during travel of the first vehicle along the one or more routes to determine when the first vehicle deviates from the first schedule, and notifying the off-board scheduling system of deviation of the first vehicle from the first schedule. The method further comprises receiving, at the first vehicle, and from the off-board scheduling system, at least one of the first schedule that is modified by the off-board scheduling system based on a notification that the first vehicle deviates from the first schedule, or a different, second schedule for the first vehicle, which is created by the off-board scheduling system based at least in part on the notification. In another embodiment, the method further comprises, on board the first vehicle, generating a second trip plan (e.g., a revision of the first trip plan) based on the first schedule that is modified or the second schedule. The second trip plan dictates second operational settings of the first vehicle as a function of at least one of time or distance traveled along the one or more routes. The second operational settings may be all different from the first operational settings, partially different, or all the same; according to an aspect, at least some of the second operational settings are different than the first operational settings.

In another embodiment, a method comprises generating, with an energy management system disposed onboard a first vehicle, a first trip plan using a first schedule that is received by the first vehicle. The first trip plan dictates first operational settings of the first vehicle as a function of at least one of time or distance traveled along one or more routes. The first schedule is for the first vehicle to travel in a transportation network (comprising the one or more routes), and is formed off-board the first vehicle at an off-board scheduling system and communicated to the first vehicle. The method further comprises receiving, at the first vehicle, and from the off-board scheduling system, at least one of the first schedule that is modified by the off-board scheduling system, or a different, second schedule for the first vehicle, which is created by the off-board scheduling system. The modified first schedule (i.e., the first schedule that is modified) is modified by the off-board scheduling system based at least in part on a notification that actual movement of the first vehicle, which is monitored during travel of the first vehicle along the one or more routes, deviates from the first schedule; and/or the second schedule is created by the off-board scheduling system based at least in part on a notification. In another embodiment, the method further comprises, on board the first vehicle, generating a second trip plan (e.g., a revision of the first trip plan) based on the first schedule that is modified or the second schedule. The second trip plan dictates second operational settings of the first vehicle as a function of at least one of time or distance traveled along the one or more routes. The second operational settings may be all different from the first operational settings, partially different, or all the same; according to an aspect, at least some of the second operational settings are different than the first operational settings.

In another embodiment, a system comprises an energy management system configured to be disposed onboard a first vehicle and to receive a first schedule from a scheduling unit configured to be disposed off-board the first vehicle. The first schedule is for the first vehicle to travel in a transportation network having one or more routes. The energy management system also is configured to generate a first trip plan using the first schedule that is received, the first trip plan dictating first operational settings of the first vehicle as a function of at least one of time or distance traveled along the one or more routes. The system further comprises a tracking unit configured to monitor actual movement of the first vehicle during travel of the first vehicle along the one or more routes to determine when the first vehicle deviates from the first schedule. The tracking unit also is configured to notify the scheduling unit of deviation of the first vehicle from the first schedule. The energy management system also is configured to generate a second trip plan (e.g., a revision of the first trip plan) responsive to receiving from the off-board scheduling unit the first schedule that is modified by the scheduling system, or a different, second schedule for the first vehicle that is created by the scheduling unit. The modified first schedule (i.e., first schedule that is modified) is modified by the scheduling system responsive to receiving a notification from the tracking unit that the first vehicle deviates from the first schedule; and/or the second schedule is created by the scheduling system responsive to receiving the notification. The second trip plan dictates second operational settings of the first vehicle as a function of at least one of time or distance traveled along the one or more routes. The second operational settings may be all different from the first operational settings, partially different, or all the same; according to an aspect, at least some of the second operational settings are different than the first operational settings.

In another embodiment, a system comprises an energy management system configured to be disposed onboard a first vehicle and to receive a first schedule from a scheduling unit configured to be disposed off-board the first vehicle. The first schedule is for the first vehicle to travel in a transportation network having one or more routes. The energy management system also is configured to generate a first trip plan using the first schedule that is received, the first trip plan dictating first operational settings of the first vehicle as a function of at least one of time or distance traveled along the one or more routes. The energy management system also is configured to generate a second trip plan (e.g., a revision of the first trip plan) responsive to receiving from the off-board scheduling unit the first schedule that is modified by the scheduling system, or a different, second schedule for the first vehicle that is created by the scheduling unit. The modified first schedule (i.e., first schedule that is modified) is modified by the scheduling system responsive to receiving a notification from a tracking unit that the first vehicle deviates from the first schedule; and/or the second schedule is created by the scheduling system responsive to receiving the notification. (For example, actual movement of the first vehicle along the one or more routes may be monitored by the tracking unit, to determine when the first vehicle deviates from the first schedule, with the tracking unit configured to send the notification to the scheduling unit of deviation of the first vehicle from the first schedule.) The second trip plan dictates second operational settings of the first vehicle as a function of at least one of time or distance traveled along the one or more routes. The second operational settings may be all different from the first operational settings, partially different, or all the same; according to an aspect, at least some of the second operational settings are different than the first operational settings.

In another embodiment, a method comprises forming a first schedule for a first vehicle to travel in a transportation network having one or more routes. The first schedule is formed off-board the first vehicle at an off-board scheduling system and communicated to the first vehicle, for use by an energy management system disposed onboard the first vehicle to generate a first trip plan that dictates first operational settings of the first vehicle as a function of at least one of time or distance traveled along the one or more routes. The method further comprises monitoring actual movement of the first vehicle during travel of the first vehicle along the one or more routes to determine when the first vehicle deviates from the first schedule. The method further comprises, responsive to receiving a notification that the first vehicle deviates from the first schedule, the scheduling system at least one of modifying the first schedule for the first vehicle, creating a different, second schedule for the first vehicle, or modifying one or more other schedules of one or more other vehicles traveling in the transportation network. At least one of the first schedule that is modified is communicated to the first vehicle (e.g., for the energy management system to generate a second trip plan based on the first schedule that is modified, which dictates second operational settings of the first vehicle as a function of at least one of time or distance traveled along the one or more routes; the second operational settings may be same or different from the first operational settings), the different, second schedule is communicated to the first vehicle (e.g., for the energy management system to generate the second trip plan based on the second schedule), or the one or more other schedules that are modified are communicated to the one or more other vehicles.

In another embodiment, a method comprises forming a first schedule for a first vehicle to travel in a transportation network having one or more routes. The first schedule is formed off-board the first vehicle at an off-board scheduling system and communicated to the first vehicle, for use by an energy management system disposed onboard the first vehicle to generate a first trip plan that dictates first operational settings of the first vehicle as a function of at least one of time or distance traveled along the one or more routes. The method further comprises, responsive to receiving a notification that the first vehicle deviates from the first schedule (e.g., a determination that the first vehicle deviates from the first schedule may be based on monitoring actual movement of the first vehicle during travel of the first vehicle along the one or more routes to determine when the first vehicle deviates from the first schedule), the scheduling system at least one of modifying the first schedule for the first vehicle, creating a different, second schedule for the first vehicle, or modifying one or more other schedules of one or more other vehicles traveling in the transportation network. At least one of the first schedule that is modified is communicated to the first vehicle (e.g., for the energy management system to generate a second trip plan based on the first schedule that is modified, which dictates second operational settings of the first vehicle as a function of at least one of time or distance traveled along the one or more routes; the second operational settings may be same or different from the first operational settings), the different, second schedule is communicated to the first vehicle (e.g., for the energy management system to generate the second trip plan based on the second schedule), or the one or more other schedules that are modified are communicated to the one or more other vehicles.

In another embodiment, a system comprises a scheduling unit configured to be disposed off-board a first vehicle and to form a first schedule for the first vehicle to travel in a transportation network. The first schedule is communicated to the first vehicle for an energy management system configured to be disposed onboard the first vehicle to generate a trip plan using the first schedule that is received, the trip plan dictating operational settings of the first vehicle as a function of at least one of time or distance traveled along one or more routes. The system further comprises a tracking unit configured to monitor actual movement of the first vehicle during travel of the first vehicle along the one or more routes to determine when the first vehicle deviates from the first schedule. The tracking unit also is configured to notify the scheduling unit of deviation of the first vehicle from the first schedule, wherein, responsive to the scheduling unit receiving a notification that the first vehicle deviates from the first schedule, the scheduling unit is configured to at least one of modify the first schedule for the first vehicle, create a different, second schedule for the first vehicle, or modify one or more other schedules of one or more other vehicles traveling in the transportation network. The system further comprises a communication unit configured to be disposed off-board the first vehicle and to communicate at least one of the first schedule that is modified to the first vehicle (e.g., for the energy management system to generate a second trip plan based on the first schedule that is modified, which dictates second operational settings of the first vehicle as a function of at least one of time or distance traveled along the one or more routes; the second operational settings may be same or different from the first operational settings), the different, second schedule to the first vehicle (e.g., for the energy management system to generate the second trip plan based on the second schedule), or the one or more other schedules that are modified to the one or more other vehicles.

In another embodiment, a system comprises a scheduling unit configured to be disposed off-board a first vehicle and to form a first schedule for the first vehicle to travel in a transportation network. The first schedule is communicated to the first vehicle for an energy management system configured to be disposed onboard the first vehicle to generate a trip plan using the first schedule that is received, the trip plan dictating operational settings of the first vehicle as a function of at least one of time or distance traveled along one or more routes. Responsive to the scheduling unit receiving a notification that the first vehicle deviates from the first schedule (e.g., the scheduling unit may be configured to receive the notification from a tracking unit that is configured to monitor actual movement of the first vehicle during travel of the first vehicle along the one or more routes to determine when the first vehicle deviates from the first schedule), the scheduling unit is configured to at least one of modify the first schedule for the first vehicle, create a different, second schedule for the first vehicle, or modify one or more other schedules of one or more other vehicles traveling in the transportation network. The system further comprises a communication unit configured to be disposed off-board the first vehicle and to communicate at least one of the first schedule that is modified to the first vehicle (e.g., for the energy management system to generate a second trip plan based on the first schedule that is modified, which dictates second operational settings of the first vehicle as a function of at least one of time or distance traveled along the one or more routes; the second operational settings may be same or different from the first operational settings), the different, second schedule to the first vehicle (e.g., for the energy management system to generate the second trip plan based on the second schedule), or the one or more other schedules that are modified to the one or more other vehicles.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A method comprising:

forming a first schedule for a first vehicle to travel in a transportation network, the first schedule formed off-board the first vehicle at an off-board scheduling system and communicated to the first vehicle;

generating, with an energy management system disposed onboard the first vehicle, a trip plan using the first schedule that is received, the trip plan dictating at least one of throttle settings or brake settings of the first vehicle as a function of at least one of time or distance traveled along one or more routes;

monitoring actual movement of the first vehicle during travel of the first vehicle along the one or more routes to determine when the first vehicle deviates from the first schedule;

notifying the off-board scheduling system of deviation of the first vehicle from the first schedule;

responsive to receiving a notification that the first vehicle deviates from the first schedule, at least one of modifying the first schedule for the first vehicle to form a modified first schedule or creating a different, second schedule for the first vehicle at the off-board scheduling system, wherein at least one of the modified first schedule or the different, second schedule is communicated to the first vehicle; and modifying, with the energy management system onboard the first vehicle, the trip plan of the first vehicle using at least one of the modified first schedule or the different, second schedule that is communicated to the first vehicle.

2. The method of claim 1, wherein at least one of the first schedule is modified or the different, second schedule is created to cause the first vehicle to avoid at least one of a meet event or a pass event between the first vehicle and at least one other vehicle traveling in the transportation network.

3. The method of claim 2, wherein at least one of the first schedule is modified or the different, second schedule is created by delaying a time that the first vehicle is to arrive at a siding section route for the at least one of the meet event or the pass event.

4. The method of claim 1, wherein the trip plan is generated such that travel of the first vehicle according to the operational settings dictated by the trip plan reduces at least one of fuel consumed or emissions generated by the first vehicle relative to the first vehicle traveling at a speed limit of the one or more routes.

5. The method of claim 1, wherein at least one of: the trip plan is generated using one or more processors of the energy management system disposed onboard the first vehicle or the first schedule is modified using one or more processors of an off-board scheduling system disposed off-board the first vehicle.

6. The method of claim 1, further comprising, responsive to receiving a notification that the first vehicle deviates from the first schedule, modifying one or more other schedules of one or more other vehicles traveling in the transportation network, the one or more other schedules that are modified being communicated to the one or more other vehicles.

7. The method of claim 1, wherein modifying the trip plan forms a modified trip plan, the method further comprising, subsequent to modifying the trip plan, controlling continued actual movement of the first vehicle during travel along the one or more routes according to the modified trip plan such that a first portion of a trip of the first vehicle along the one or more routes is controlled according to the trip plan and a subsequent, second portion of the trip of the first vehicle along the one or more routes is controlled according to the modified trip plan.

8. A system comprising:

a scheduling unit configured to be disposed off-board a first vehicle and to form a first schedule for the first vehicle to travel in a transportation network, the first schedule communicated to the first vehicle;

an energy management system configured to be disposed onboard the first vehicle and to receive the first schedule, the energy management system also configured to generate a trip plan using the first schedule that is received, the trip plan dictating at least one of throttle settings or brake settings of the first vehicle as a function of at least one of time or distance traveled along one or more routes;

a tracking unit configured to monitor actual movement of the first vehicle during travel of the first vehicle along the one or more routes to determine when the first vehicle deviates from the first schedule, the tracking unit also configured to notify the scheduling unit of deviation of the first vehicle from the first schedule, wherein, responsive to the scheduling unit receiving a notification that the first vehicle deviates from the first schedule, the scheduling unit is configured to at least one of modify the first schedule for the first vehicle or create a different, second schedule for the first vehicle; and a communication unit configured to be disposed off-board the first vehicle and to communicate at least one of the first schedule that is modified or the different, second schedule to the first vehicle, the energy management system onboard the first vehicle being configured to modify the trip plan of the first vehicle using at least one of the first schedule that is modified or the different, second schedule that is communicated to the first vehicle.

9. The system of claim 8, wherein the scheduling unit is configured to at least one of modify the first schedule or create the different, second schedule to cause the first vehicle to avoid at least one of a meet event or a pass event between the first vehicle and at least one other vehicle traveling in the transportation network.

10. The system of claim 9, wherein the scheduling unit is configured to at least one of modify the first schedule or create the different, second schedule by delaying a time that the first vehicle is to arrive at a siding section route for the at least one of the meet event or the pass event.

11. The system of claim 8, wherein the energy management system generates the trip plan such that travel of the first vehicle according to the operational settings dictated by the trip plan reduces at least one of fuel consumed or emissions generated by the first vehicle relative to the first vehicle traveling at a speed limit of the one or more routes.

12. The system of claim 8, wherein one or more of the scheduling unit, the energy management system, the tracking unit, or the communication unit includes one or more processors.

13. The system of claim 8, wherein, responsive to receiving a notification that the first vehicle deviates from the first schedule, the off-board scheduling system is configured to modify one or more other schedules of one or more other vehicles traveling in the transportation network, the off-board scheduling system further configured to communicate the one or more other schedules that are modified to the one or more other vehicles.

14. A method comprising:

receiving a first schedule for a first vehicle to travel in a transportation network from an off-board scheduling system;

generating an initial trip plan based on the first schedule using an energy management system onboard the first vehicle, the initial trip plan dictating at least one of throttle settings or brake settings of the first vehicle as a function of at least one of time or distance traveled along one or more routes;

monitoring actual movement of the first vehicle during travel of the first vehicle along the one or more routes according to the initial trip plan to determine when the first vehicle deviates from the first schedule;

responsive to determining that the travel of the first vehicle deviates from the first schedule, receiving at least one of a modified first schedule or a different, second schedule from the off-board scheduling system; and modifying, using the energy management system, the initial trip plan to form a modified trip plan of the first vehicle using at least one of the modified first schedule or the different, second schedule such that the first vehicle continues traveling along the one or more routes according to the modified trip plan.

15. The method of claim 14, wherein the at least one of the modified first schedule or the different, second schedule includes at least one of a different scheduled arrival time, a different destination location, or a different path to be taken by the first vehicle during travel of the first vehicle along the one or more routes relative to the first schedule.

16. The method of claim 14, wherein the initial trip plan and the modified trip plan are generated using one or more processors of the energy management system disposed onboard the first vehicle.

17. The method of claim 14, further comprising notifying the off-board scheduling system that travel of the first vehicle deviates from the first schedule responsive to determining that the travel of the first vehicle deviates from the first schedule and prior to receiving at least one of the modified first schedule or the different, second schedule from the off-board scheduling system.

18. The method of claim 14, further comprising:

monitoring continued actual movement of the first vehicle during travel of the first vehicle along the one or more routes according to the modified trip plan to determine when the first vehicle deviates from at least one of the modified first schedule or the different, second schedule; and responsive to determining that the travel of the first vehicle deviates from the modified first schedule or the different, second schedule, at least one of:

modifying the first schedule again for the first vehicle, creating a different, third schedule for the first vehicle, or modifying one or more other schedules of one or more other vehicles traveling in the transportation network.

* * * * *